United States Patent
Luski et al.

(10) Patent No.: US 9,172,076 B2
(45) Date of Patent: Oct. 27, 2015

(54) MEMBRANES SUITABLE FOR USE AS SEPARATORS AND ELECTROCHEMICAL CELLS INCLUDING SUCH SEPARATORS

(75) Inventors: Shalom Luski, Rehovot (IL); Charles Linder, Rehovot (IL); Arieh Meitav, Rishon Lezion (IL)

(73) Assignee: ETV ENERGY LTD., Herzliya (IL)

( * ) Notice: Subject to any disclaimer, the term of this patent is extended or adjusted under 35 U.S.C. 154(b) by 197 days.

(21) Appl. No.: 13/979,134

(22) PCT Filed: Jan. 11, 2012

(86) PCT No.: PCT/IB2012/050145
§ 371 (c)(1),
(2), (4) Date: Jul. 10, 2013

(87) PCT Pub. No.: WO2012/095805
PCT Pub. Date: Jul. 19, 2012

(65) Prior Publication Data
US 2013/0309549 A1    Nov. 21, 2013

Related U.S. Application Data

(60) Provisional application No. 61/431,551, filed on Jan. 11, 2011, provisional application No. 61/466,491, filed on Mar. 23, 2011.

(51) Int. Cl.
*H01M 2/16* (2006.01)
*H01M 10/0525* (2010.01)

(52) U.S. Cl.
CPC ............ *H01M 2/1686* (2013.01); *H01M 2/166* (2013.01); *H01M 2/1653* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| 4,098,867 | A | 7/1978 | Grinstead et al. |
| 4,273,903 | A | 6/1981 | Rose |
| 4,413,106 | A | 11/1983 | Coplan et al. |
| 4,468,501 | A | 8/1984 | Zampini et al. |
| 5,013,765 | A | 5/1991 | Sluma et al. |
| 5,028,337 | A | 7/1991 | Linder et al. |
| 5,438,082 | A | 8/1995 | Helmer-Metzmann et al. |

(Continued)

FOREIGN PATENT DOCUMENTS

| EP | 2214226 A1 | 8/2010 |
| JP | 11-121012 A | 4/1999 |

(Continued)

OTHER PUBLICATIONS

Abe et al., Functional electrolytes: Synergetic effect of electrolyte additives for lithium-ion battery. J Power Sources 2008;184:449-455.

(Continued)

*Primary Examiner* — Patrick Ryan
*Assistant Examiner* — Wyatt McConnell
(74) *Attorney, Agent, or Firm* — Michael A. Whittaker; Acuity Law Group, P.C.

(57) ABSTRACT

Disclosed are membranes suitable for use as separators in electrochemical cells as well as electrochemical cells, where the membranes are configured to substantially reduce the passage of multivalent ions therethrough without substantially reducing the permeability of the membranes to lithium ions.

18 Claims, 1 Drawing Sheet

(56) References Cited

U.S. PATENT DOCUMENTS

| | | | |
|---|---|---|---|
| 5,656,386 | A | 8/1997 | Scherer et al. |
| 5,804,606 | A | 9/1998 | Surowiec et al. |
| 6,042,966 | A | 3/2000 | Cheu |
| 6,048,638 | A | 4/2000 | Pendalwar |
| 6,723,758 | B2 | 4/2004 | Stone et al. |
| 6,872,781 | B2 | 3/2005 | Hedhli et al. |
| 2002/0127474 | A1* | 9/2002 | Fleischer et al. ............ 429/309 |
| 2005/0164086 | A1* | 7/2005 | Bofinger et al. ............. 429/224 |
| 2007/0026315 | A1* | 2/2007 | Lampe-Onnerud et al. .. 429/224 |
| 2007/0224516 | A1 | 9/2007 | Deguchi et al. |
| 2007/0254209 | A1 | 11/2007 | Baba et al. |
| 2008/0118822 | A1* | 5/2008 | Lee ................................. 429/94 |
| 2008/0254367 | A1 | 10/2008 | Hamamoto et al. |
| 2009/0107520 | A1 | 4/2009 | Lee et al. |
| 2009/0301595 | A1 | 12/2009 | Bonnet et al. |
| 2010/0069293 | A1 | 3/2010 | Bolotin et al. |
| 2010/0159314 | A1* | 6/2010 | Kim et al. ..................... 429/120 |
| 2010/0239900 | A1* | 9/2010 | Take et al. ..................... 429/144 |
| 2010/0261289 | A1 | 10/2010 | Fabis et al. |
| 2010/0273045 | A1* | 10/2010 | Hasegawa et al. ............ 429/163 |
| 2011/0003209 | A1* | 1/2011 | Katayama et al. ............ 429/246 |

FOREIGN PATENT DOCUMENTS

| | | |
|---|---|---|
| JP | 2000-021381 A | 1/2000 |
| JP | 2002-025527 A | 1/2002 |
| WO | 2006073277 A1 | 7/2006 |
| WO | 2012095805 A1 | 7/2012 |

OTHER PUBLICATIONS

Aurbach et al., Studies of cycling behavior, ageing, and interfacial reactions ofLiNi0.5Mn1.5O4 and carbon electrodes for lithium-ion 5-V cells . J Power Sources 2006;162(2):780-789.

International Search Report and Written Opinion issued in PCT/IB2012/050145 dated May 18, 2012.

International Preliminary Report on Patentability issued in PCT/IB2012/050145 dated Jul. 16, 2013.

Gnanaraj et al., Improving the high-temperature performance of LiMn2O4 spinel electrodes by coating the active mass with MgO via a sonochemical method. Electrochem Comm. 2003;5:940-945.

Jarvis et al., Use of grafted PVdF based polymers in Lithium ion batteries. J Power Sources 2001;97-98:664-666.

Kim and Lim, Surface-Modified Membrane as A Separator for Lithium-Ion Polymer Battery. Energies 2010;3:866-885.

Kopitzke et al., Sulfonation of a Poly(phenylquinoxaline) Film . J Polym Sci. 1998;86:1197-1199.

Uchimoto et al., Ionically Conductive Thin Polymer Films Prepared by Plasma Polymerization. Part 7. Preparation and Characterization of Solid Polymer Electrolyte Having Fixed Carboxylic Acid Groups With Single Mobile Species. Solid State Ionics 1990;40-41:624-627.

Alberti and Casciola, Layered metallV phosphonates, a large class of inorgano-organic proton conductors. Solid State Ionics 1997;97:177-186.

\* cited by examiner

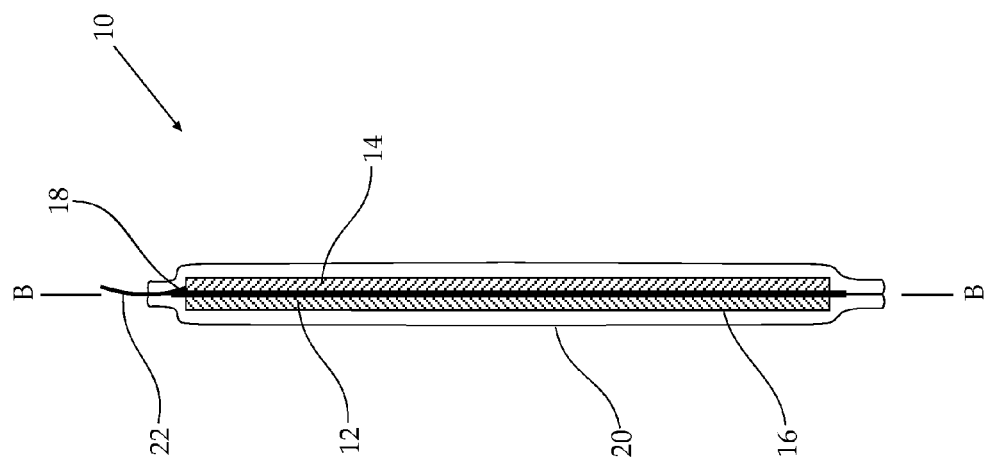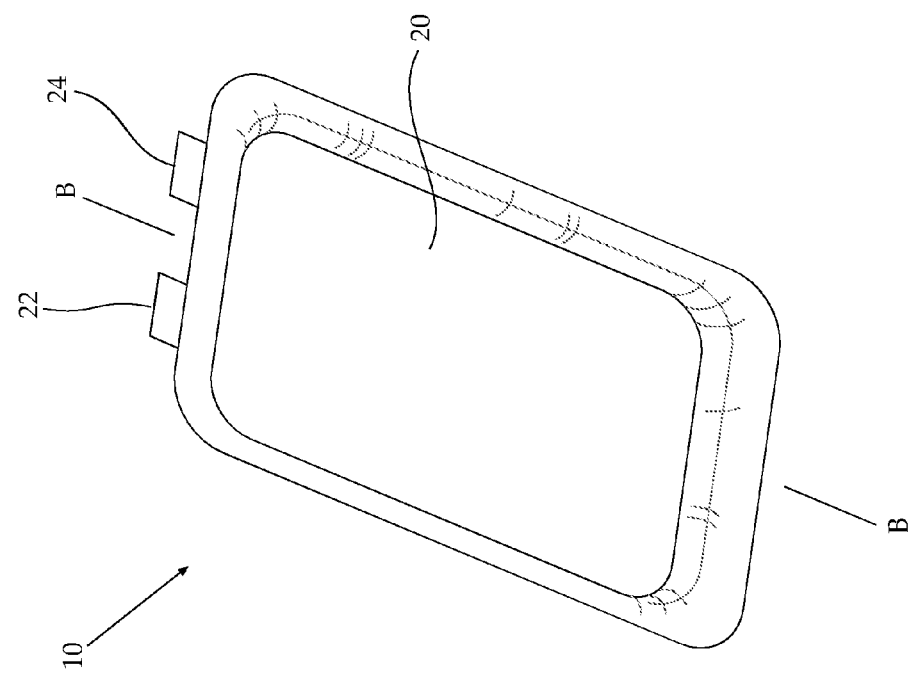

US 9,172,076 B2

MEMBRANES SUITABLE FOR USE AS SEPARATORS AND ELECTROCHEMICAL CELLS INCLUDING SUCH SEPARATORS

RELATED APPLICATIONS

The present application is the US National Phase Entry of PCT/IB2012/050145 having an International Filing date of Jan. 11, 2012 published on Jul. 19, 2012 as WO2012/095805, that gains priority from U.S. Provisional Patent Applications U.S. 61/431,551 filed 11 Jan. 2011 and U.S. 61/466,491 filed 23 Mar. 2011 that is included by reference as if fully set-forth herein.

FIELD AND BACKGROUND OF THE INVENTION

The invention, in some embodiments, relates to the field of electrochemical cells and, more particularly but not exclusively, to membranes suitable for use as separators in electrochemical cells as well as electrochemical cells including such membranes as separators. In some embodiments, the membranes include chelators of multivalent cations.

A secondary electrochemical cell generally includes a negative electrode comprising a negative active material with a reduction potential, a positive electrode comprising a positive active material with an oxidation potential and an electrolyte that allows transport of ions between the electrodes. Electrically insulating the positive electrode from the negative electrode is a separator that is permeable to the passage of ions in the electrolyte. The sum of the reduction potential and the oxidation potential is the standard cell potential of the electrochemical cell.

A well-known type of secondary electrochemical cell is the lithium-ion secondary electrochemical cell. A typical lithium-ion secondary electrochemical cell includes a lithium-ion intercalating material (typically a carbonaceous material such as graphite or hard carbon) as the negative active material and a lithium-ion containing material (e.g., a $LiCoO_2$) as the positive active material. During cell charging, the positive active material is oxidized, releasing lithium ions into the electrolyte (e.g., $LiCoO_2 > Li_{1-x}CO_2 + xLi^+ + xe^-$) while lithium ions from the electrolyte are intercalated in the negative active material ($xLi^+ + xe^- + 6C > Li_xC_6$). During cell discharge, the positive active material is reduced and reintegrates lithium ions from the electrolyte while lithium ions are released from the negative active material.

In primary electrochemical cells, the negative electrode is the anode and the positive electrode is more often called a cathode.

Art relevant to the teachings herein includes Kim and Lim (Surface Modified membranes as a separator for LI batteries in Energies 2010, V3 866-885) and Jarvis et al (Use of grafted PVDF based polymers in Lithium ion batteries) in Journal of Power Sources 97-98 (2001) 664-666.

SUMMARY OF THE INVENTION

Aspects of some embodiments of the invention relate to electrochemical cells and methods of making electrochemical cells. Aspects of some embodiments of the invention relate to membranes suitable for use as separators in electrochemical cells and methods of making such membranes.

Aspects of some embodiments of the invention relate to electrochemical cells, preferably secondary electrochemical cells but also primary electrochemical cells, especially lithium-ion electrochemical cells, including a separator configured to be substantially permeable to lithium ions but to have reduced permeability to multivalent cations, such as Mn2+. Separator permeability to lithium ions is such that the internal resistance of the electrochemical cell is sufficiently low to allow the electrochemical cell to be useful. Reduced permeabilty to multivalent cations is sufficient to substantially reduce the amount of multivalent cations that pass through the separator, for example from the postive electrode to the negative electrode.

According to an aspect of some embodiments of the invention, there is provided an electrochemical cell, comprising:
  a. an electrode assembly including:
    i. at least one positive electrode having a height, a breadth and a thickness bearing a positive active material on at least one face thereof;
    ii. at least one negative electrode having a height, a breadth and a thickness bearing a negative active material on at least one face thereof, facing the positive electrode; and
    iii. a separator disposed between the positive electrode and the negative electrode and electrically insulating the positive electrode from the negative electrode; and
  b. an electrolyte contacting the positive electrode, the negative electrode and the separator;
wherein the separator is a membrane permeable to lithium ions and including: a support sheet; and on the support sheet, binding functions configured to bind multivalent cations preferentially to lithium ions. In some embodiments, the electrochemical cell is a primary electrochemical cell. In some embodiments, the electrochemical cell is a secondary electrochemical cell. In some embodiments, the electrochemical cell is a lithium-ion secondary electrochemical cell, wherein: the positive-active material is a lithium-ion containing positive active material; the negative-active material is a lithium-ion intercalating negative active material; and wherein the electrolyte includes a lithium ions.

According to an aspect of some embodiments of the invention, there is also provided a membrane suitable for use as a separator in an electrochemical cell, comprising: a support sheet; and on the support sheet, binding functions configured to bind multivalent cations preferentially to lithium ions, where the membrane is permeable to lithium ions when in functional contact with an electrolyte.

In some embodiments of the electrochemical cell or membrane, the multivalent cations are Mn2+.

In some embodiments, the binding functions include counter ions. In some embodiments, at least 5% and even at least 50% of the counter ions are lithium ions.

In some embodiments of the electrochemical cell or membrane, the membrane has a porosity of not more than about 80%, not more than about 60%, and even not more than about 40%. In some embodiments of the electrochemical cell or membrane, the membrane has a porosity of not less than about 10%, not less than about 15% and even not less than about 20%.

In some embodiments of the electrochemical cell or membrane, the membrane has a thickness of not more than about 150 micrometers. In some embodiments of the electrochemical cell or membrane, the membrane has a thickness not less than about 10 micrometers. In some embodiments of the electrochemical cell or membrane, the membrane has a thickness of between about 20 micrometers and about 40 micrometers.

In some embodiments of the electrochemical cell or membrane, on the support sheet there is a single type of binding function. In some embodiments of the electrochemical cell or membrane, on the support sheet, there are at least two different types of binding functions.

In some embodiments of the electrochemical cell or membrane, the membrane further comprises on the support sheet, lithium-permeation functions configured to enhance the permeability of the membrane to lithium ions. For example, in some such embodiments, the support sheet comprises a sulfonated polysulfone polymer derivative and an iminodiacetic acid PPO polymer, includes sulfonic groups as the lithium-permeation function and iminodiacetic groups as the binding function, e.g., Separator D in the Examples. For example, in some such embodiments, the support sheet comprises a fluorinated sulfonated polysulfone polymer derivative and an iminodiacetic acid PPO polymer, includes sulfonic groups as the lithium-permeation function and iminodiacetic groups as the binding function, e.g., Separator E in the Examples.

In some embodiments of the electrochemical cell or membrane, the membrane further comprises on the support sheet densely-packed cationic functions configured to repel multivalent cations from the membrane, preferably without substantially repelling lithium ions. For example, in some such embodiments, the cationic functions are dimethylammonium groups borne attached to the methyl groups of 2,6-polyphenylene oxide, e.g., Separator F in the Examples.

In some embodiments of the electrochemical cell or membrane, the support sheet comprises a sheet of polymer to which at least one type of the binding function is grafted, e.g., to the polymer backbone or to polymer side groups. For example, in some such embodiments, the support sheet comprises an iminodiacetic acid PPO polymer derivative, including iminodiacetic acid residues as a the binding function, e.g., separator A in the Examples. For example, in some such embodiments, the support sheet comprises an aminoethylphosphonic acid PPO polymer derivative, including aminoethylphosphonic acid residues as a the binding function, e.g., separator B in the Examples. In some embodiments of the electrochemical cell or membrane, the support sheet further comprises a HFP copolymer of PVDF, e.g., separator A or B in the Examples.

In some embodiments of the electrochemical cell or membrane, the support sheet comprises a sheet of polymer to which a layer of adhering substrate adheres.

In some such embodiments, the adhering substrate comprises a polymer to which at least one type of the binding function is grafted, e.g., to the polymer backbone or to polymer side groups.

In some such embodiments, at least one type of binding function is borne by particles, the particles adhered to the support sheet with the adhering substrate. In some such embodiments, the particles are selected from the group consisting of organic particles, inorganic particles, hybrid particles and mixtures thereof. In some such embodiments, the inorganic particles are selected from the group consisting of bentonite and zeolite. In some such embodiments, the organic particles are selected from the group consisting of ion-exchange resins (e.g., Amberlite). For example, in some such embodiments, the support sheet includes a sheet of microporous PVDF; the adhering substrate includes Hexafluoropropylene (HFP) copolymer of PVDF; and the binding function includes particulate ion-exchange resin, e.g., separator O in the Examples.

In some such embodiments, the particles include counter ions. In some embodiments, at least 5% and even at least 50% of the counter ions are lithium ions. In some embodiments, at least 95% of the counter ions and even substantially all the counter ions are lithium ions.

In some such embodiments, the particles comprises a single type of particle bearing a binding function. In some such embodiments, the particles comprise at least two different types of particles bearing a binding function.

In some such embodiments, the average size of the particles is not more than about 1000 nanometers, not more than about 500 nanometers and even not more than about 250 nanometers. In some such embodiments, the average size of the particles is not less than about 10 nanometers, not less than about 20 nanometers and even not less than about 30 nanometers.

The amount of particles is any suitable amount of particles. Typically, it is preferred to have a maximal amount of particles (and consequently binding functions) that is sufficiently physically robust and does not substantially adversely effect the permeablity of lithium ions through the membrane. In some embodiments, the weight ratio of support sheet to adhering substrate to particles is 65%-85%:5%-25%:5%-15%, and in some embodiments even 70%-80%:10%-25%:5%-15%.

In some embodiments of the electrochemical cell or membrane, the membrane comprises at least two discrete sheets constituting the support sheet. In some such embodiments of the electrochemical cell or membrane, at least one of the discrete sheets include the binding functions. In some such embodiments, at least one of the discrete sheets includes lithium-permeation functions configured to enhance the permeability of the membrane to lithium ions. In some such embodiments, at least one of the discrete sheets includes densely-packed cationic functions configured to repel multivalent cations from the membrane without substantially repelling lithium ions. In some such embodiments, at least two of the discrete sheets are substantially identical. In some such embodiments, at least two of the discrete sheets are substantially different. In some such embodiments, at least two of the discrete sheets are substantially different.

In some such embodiments, at least one discrete sheet is neutral, that is to say, devoid of the binding functions and of the lithium-permeation function and of the densely-packed cationic functions configured to repel multivalent cations, e.g., separator C in the Examples. In some such embodiments, the neutral sheet is equivalent to a prior art separator, e.g., fashioned from a porous sheet of polyethylene, polypropylene, PVDF or PTFE. In some such embodiments, the membrane comprises at least three discrete sheets stacked together to constitute the support sheet, wherein the two terminal discrete sheets are neutral. Some such arrangement has the advantage of increased physical strength and/or function to prevent contact of the surface of the electrodes with the binding functions and of the lithium-permeation function and of the densely-packed cationic functions configured to repel multivalent cations.

According to an aspect of some embodiments of the invention, there is also provided an electrochemical cell, comprising:
  a. an electrode assembly including:
    i. at least one positive electrode having a height, a breadth and a thickness bearing a positive active material on at least one face thereof;
    ii. at least one negative electrode having a height, a breadth and a thickness bearing a negative active material on at least one face thereof, facing the positive electrode; and
    iii. a separator disposed between the positive electrode and the negative electrode and electrically insulating the positive electrode from the negative electrode; and b. an electrolyte contacting the positive electrode, the negative electrode and the separator;

the separator a membrane permeable to lithium ions and including: a support sheet; and on the support sheet, densely-packed cationic functions configured to repel multivalent cations from the membrane without substantially repelling lithium ions. In some embodiments, the electrochemical cell is a primary electrochemical cell. In some embodiments, the electrochemical cell is a secondary electrochemical cell. In some embodiments, the electrochemical cell is a lithium-ion secondary electrochemical cell, wherein: the positive-active material is a lithium-ion containing positive active material; the negative-active material is a lithium-ion intercalating negative active material; and wherein the electrolyte includes a lithium ions.

According to an aspect of some embodiments of the invention, there is also provided a membrane suitable for use as a separator in a electrochemical cell, comprising: a support sheet; and on the support sheet, densely-packed cationic functions configured to repel multivalent cations from the membrane without substantially repelling lithium ions.

In some embodiments of the electrochemical cell or membrane, the membrane has a porosity of not more than about 80%, not more than about 60%, and even not more than about 40%. In some embodiments of the electrochemical cell or membrane, the membrane has a porosity of not less than about 10%, not less than about 15% and even not less than about 20%.

In some embodiments of the electrochemical cell or membrane, the membrane has a thickness of not more than about 150 micrometers. In some embodiments of the electrochemical cell or membrane, the membrane has a thickness not less than about 10 micrometers. In some embodiments of the electrochemical cell or membrane, the membrane has a thickness of between about 20 micrometers and about 40 micrometers.

In some embodiments of the electrochemical cell or membrane, the membrane further comprises on the support sheet, lithium-permeation functions configured to enhance the permeability of the membrane to lithium ions.

In some embodiments of the electrochemical cell or membrane, the membrane further comprises on the support sheet, binding functions configured to bind multivalent cations preferentially to lithium ions.

In some embodiments of the electrochemical cell or membrane, the membrane comprises at least two discrete sheets constituting the support sheet. In some such embodiments of the electrochemical cell or membrane, at least one of the discrete sheets include the densely-packed cationic functions. In some such embodiments, at least one of the discrete sheets includes lithium-permeation functions configured to enhance the permeability of the membrane to lithium ions. In some such embodiments, at least one of the discrete sheets includes binding functions configured to bind multivalent cations preferentially to lithium ions. In some such embodiments, at least two of the discrete sheets are substantially identical. In some such embodiments, at least two of the discrete sheets are substantially different. In some such embodiments, at least two of the discrete sheets are substantially different.

In some such embodiments, at least one discrete sheet is neutral, that is to say, devoid of the binding functions and of the lithium-permeation function and of the densely-packed cationic functions configured to repel multivalent cations. In some such embodiments, the neutral sheet is equivalent to a prior art separator, e.g., fashioned from a porous sheet of polyethylene, polypropylene, PVDF or PTFE. In some such embodiments, the membrane comprises at least three discrete sheets stacked together to constitute the support sheet, wherein the two terminal discrete sheets are neutral.

According to an aspect of some embodiments of the invention, there is also provided a battery, comprising any of the electrochemical cells as described herein.

Unless otherwise defined, all technical and scientific terms used herein have the same meaning as commonly understood by one of ordinary skill in the art to which the invention pertains. In case of conflict, the patent specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

BRIEF DESCRIPTION OF THE FIGURES

Some embodiments of the invention are described herein described with balancing to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 1A and 1B are a schematic depiction of an electrochemical cell as described herein.

DESCRIPTION OF SOME EMBODIMENTS OF THE INVENTION

Aspects of the invention relate to electrochemical cells, including secondary electrochemical cells but also primary electrochemical cells, and especially lithium-ion secondary electrochemical cells, that in some embodiments have performance superior to equivalent known electrochemical cells by including a separator configured to substantially reduce the passage of multivalent ions therethrough. Aspects of the invention relate to membranes suitable for use as a separator in a electrochemical cell, including secondary electrochemical cells but also primary electrochemical cells, especially a lithium-ion secondary electrochemical cell, configured to substantially reduce the passage of multivalent ions therethrough when used as a separator.

The principles, uses and implementations of the teachings of the invention may be better understood with reference to the accompanying description and figures. Upon perusal of the description and figures, one skilled in the art is able to implement the teachings of the invention without undue effort or experimentation.

Before explaining at least one embodiment of the invention in detail, it is to be understood that the invention is not limited in its application to the details set forth herein. The invention can be implemented with other embodiments and can be practiced or carried out in various ways. It is also understood that the phraseology and terminology employed herein is for descriptive purpose and should not be regarded as limiting.

Lithium-ion secondary electrochemical cells are assembled uncharged. One or more positive electrodes bearing a positive active material, one or more negative electrodes bearing a negative active material and one or more separators are assembled to constitute a laminated electrode assembly where a positive active material layer on a positive electrode faces a negative active material layer on a negative electrode, with a separator disposed between the two electrode layers to electrically insulate the two electrode layers one from the other. The laminated electrode assembly having a desired laminated structure (e.g., flat, stacked, jelly-roll) is placed inside a cell-container. An electrolyte is added to saturate the electrodes and the separators, before or after placement in the cell container. The cell-container is sealed so that a positive contact functionally associated with the positive electrode or electrodes and a negative contact functionally associated with the negative electrode or electrodes are accessible (electrically contactable) from outside the sealed cell-container.

For cell charging, the positive and negative contacts are functionally associated with an electrical power source that charges the electrochemical cell by oxidizing a component of the positive active material releasing lithium ions from the positive active material into the electrolyte, loading the negative active material with electrons and intercalating lithium ions from the electrolyte into the negative active material.

During cell discharge, the positive and negative contacts are functionally associated with an electrical load. Electrons move from the negative active material to the positive active material through the electrical load, leading to reduction of a component of the positive active material, release of lithium ions intercalated in the negative active material to the electrolyte and reintegration of lithium ions from the electrolyte into the positive active material.

During the first few charging events (formation cycles), components of the electrolyte are reduced on the surface of the negative active material and oxidized on the surface of the positive active material, forming a lithium ion-permeable electrically-insulating insoluble layer, the solid-electrolyte interphase (SEI), at both electrodes. Formation of the SEI uses charge and therefore reduces the capacity of the cell. However, as the SEI is electrically insulating, once an active material is completely coated with a sufficiently dense SEI layer, no further substantial reduction or oxidation of electrolyte occurs on the surfaces of the active materials so cell capacity remains substantially constant. Additionally, once a sufficiently dense SEI layer is formed, reactions with impurities and gas-formation inside the cell are substantially prevented.

The exact nature of the SEI is determined by the nature of the electrolyte components that are reduced or oxidized at the electrodes. It is known to add additives to the electrolyte to generate an SEI having advantageous properties, see for example Abe K et al *Journal of Power Sources* 2008, 184, 449-455.

If an SEI includes too many imperfections, reduction or oxidation of electrolyte components with SEI formation may continue, using charge (irreversibly reducing cell capacity so that cell cyclability is reduced) and increasing SEI thickness (increasing cell internal resistance so that the maximal charge rate and the maximal current of the cell are limited).

It is known in the art and experimentally confirmed that lithium-ion secondary electrochemical cells comprising a positive active material having an oxidation potential greater than 4.2 V vs. Li/Li+ have insufficient performance. Specifically, it is seen that such cells suffer from a continuous irreversible capacity loss with each charge/discharge cycle that quickly renders the electrochemical cell unusable.

Although not wishing to be held to any one theory, the Inventors hypothesize that in all electrochemical cells oxidation of electrolyte on the surface of the positive active material produces soluble products, some positively charged, that migrate through the electrolyte to the surface of the negative active material. The amount of these soluble products increases with greater positive active material oxidation potentials, and becomes practically significant at oxidation potentials greater than 4.2 V vs. Li/Li+. Further, with increasing oxidation potential, the nature of the soluble products changes to become more problematic, especially at oxidation potentials greater than 4.2 V vs. Li/Li Further, reduction and oxidation of components of some positive active materials, especially (but not necessarily exclusively) positive active materials having oxidation potentials greater than 4.2 V vs. Li/Li+ leads to the production of soluble metal cations that migrate through the electrolyte to the surface of the negative active material. Formation of such soluble metal cations is exceptionally significant when the positive active material includes manganese, for example in composite lithium metal oxides with a spinel structure having the general formulas $LiMn(IV)_xM_yO_z$ (LMS), for example $LiMn_2O_4$, and $LiNi(II)_wMn(IV)_xM_yO_z$ (LiMNS) for example $LiNi_{0.5}Mn_{1.5}O_4$, where M represents an additional cation such as Al, Ti, Zn and the like, and y is between 0 and 0.5. For example, in some such electrochemical cells, $Mn^{3+}$ cations in the positive active material undergo disproportionation reactions, producing insoluble $Mn^{4+}$ and soluble $Mn^{2+}$ cations. The soluble Mn2+ cations subsequently migrate through the electrolyte to the negative electrode during a subsequent charging cycles.

Soluble positively-charged entities (e.g., produced by oxidation of electrolyte components or metal cations from the positive active material) produced during the formation cycles, especially with positive active materials having an oxidation potential greater than 4.2 V vs Li/Li+, that reach the negative electrode are reduced on the surface of the negative active material and interfere with the formation of the desired thin, dense and homogenous negative electrode SEI. Additionally, metal cations reduced on the surface of the negative active material potentially form conductive paths through the negative electrode SEI, from the negative active material to the electrolyte. As a result, the negative electrode SEI is ineffective in stopping further reduction reactions of electrolyte components at the negative electrode. During subsequent charge/discharge cycles, further reduction reactions may use charge, leading to electrode imbalance, permanent capacitance loss, formation of gas inside the cell and increasing cell internal resistance.

It is important to note that electrochemical cells including Li-Manganese-Spinel ($LiMn_2O_4$, shorthand LNMS) as a positive active material charged only to 4.2V also exhibit lack of stability and impedance increase at elevated temperature. This is not related to electrolyte oxidation, but presumably to the manganese solubility during cycling and/or storage upon manganese disproportionation ($Mn^{3+} \rightarrow Mn^{2+}+Mn^{4+}$). In the case of LNMS, Nickel is the only element being subjected to the Red-Ox ($Ni^{2+} \leftarrow \rightarrow Ni^{4+}$) during cycling while Manganese is at its stable $Mn^{4+}$ form.

For electrochemical cells including LNMS as a positive active material, the main fade mechanisms of such electrochemical cells are:

(a) Residual $Mn^{3+}$, left behind during the synthesis and heat treatment/annealing process of the positive active material;

(b) Minor electrolyte oxidation at the high positive electrode potential, partially effected by the catalytic and strongly oxidizing $Ni^{4+}$;

(c) Intermediate species resulting from electrolyte oxidation, including some hydroxillic groups that catalyze $LiPF_6$ hydrolysis to generate HF;

(d) HF etching of the LNMS to generate mostly soluble manganese ($Mn^{3+}/Mn^{2+}$);

(e) Manganese cation migration to the negative electrode and inclusion into the negative electrode SEI while being reduced to metallic manganese; and (f) Mn-doping of SEI on the negative electrode break up its electronic insulation, thereby inducing electrolyte reduction at the negative electrode.

The bottom-line of above sequential mechanism, is cell fading, mostly due to Poor cycle efficiency (cycle efficiency=Cd/Cc) causing capacity unbalance and gassing, with parallel built up of thick layer on the anode leading to further increase of cell impedance. (Cells with reference electrode revealed primarily anodic over-potential with only secondary effect of the positive electrode on the cell impedance).

Aspects of the invention relate to electrochemical cells, preferably secondary electrochemical cells, especially lithium-ion electrochemical cells, that include a separator including binding functions configured to bind multivalent cations such as Mn2+ preferentially to lithium ions. In some embodiments, the binding functions are configured to selectively bind multivalent cations, that is to say the binding functions bind (e.g., complex, chelate and/or entrap) multivalent cations such as Mn2+ but do not substantially bind lithium ions, such that the bonded multivalent cations do nor substantially permeate through the separator but the lithium ions that are not bonded do permeate through the separator. Multivalent cations formed at the positive electrode migrate through the electrolyte to the separator and at least some are bound and prevented from reaching the negative electrode. However, lithium ions pass the separator with little or no interference. In such a way, the teachings herein overcome at least some of the challenges described above and in some embodiments leads to an electrochemical cell with improved performance, for example, improved cyclability and a longer cell lifetime due to a reduced extent of capacity loss during charge/discharge cycles.

The teachings herein are applicable to electrochemical cells including a wide range of positive active materials, especially positive active materials that are at least partially soluble in electrolyte and/or which stability may be effected by electrolyte oxidation with positive electrodes of high potential. Some embodiments of the teachings herein at least partially resolve the failure mechanisms of Manganese-containing positive active materials at an elevated temperature, storage/aging and long-cycling.

According to an aspect of some embodiments of the invention there is provided an electrochemical cell, comprising:

a. an electrode assembly including:
   i. at least one positive electrode having a height, a breadth and a thickness bearing a positive active material on at least one face thereof;
   ii. at least one negative electrode having a height, a breadth and a thickness bearing a negative active material on at least one face thereof, facing the positive electrode; and
   iii. a separator disposed between the positive electrode and the negative electrode and electrically insulating the positive electrode from the negative electrode; and
b. an electrolyte contacting the positive electrode, the negative electrode and the separator;

the separator a membrane permeable to lithium ions and including: a support sheet; and on the support sheet, binding functions configured to bind multivalent cations preferentially to lithium ions.

It is preferred that the binding of the binding function to multivalent cations be as efficient as possible so that most, if not all, multivalent cations that migrate from the positive electrode towards the negative electrode bind to the binding functions and do not pass through the separator. At the same time, it is preferred that the separator be sufficiently permeable to lithium ions to allow the cell to have useful charge and discharge rates.

That said, according to an aspect of some embodiments of the invention there is provided a electrochemical cell as described above where the separator is permeable to lithium ions and includes: a support sheet; and on the support sheet, densely-packed cationic functions (in some embodiments in addition to, in some embodiments instead of the binding functions) configured to repel multivalent cations from the membrane without substantially repelling lithium ions.

Although the electrochemical cell can be any suitable electrochemical cell, in some embodiments the teachings herein are exceptionally useful for secondary electrochemical cells, especially lithium ion secondary electrochemical cells, especially lithium ion secondary cells where the positive-active material is a lithium-ion containing positive active material; the negative-active material is a lithium-ion intercalating negative active material; and where the electrolyte includes a lithium ions.

An electrochemical cell according to the teachings herein generally further comprises a positive contact functionally associated with the positive electrode and a negative contact functionally associated with the negative electrode.

An electrochemical cell as described herein is assembled in any suitable fashion, for example as known in the art. In some embodiments, a desired laminated electrode assembly is made and placed inside a cell-container (e.g., a rigid cell-container such as a cylindrical can or button cell cell-container, or a flexible pouch such as described in U.S. Pat. Nos. 6,042,966 or 6,048,638). Subsequently, a sufficient amount of electrolyte is added to ensure electrical contact between the positive electrode and the negative electrode. The cell-container is subsequently sealed (usually after one or more degassing cycles), usually so that the positive and negative contacts are accessible from outside the cell-container and the electrochemical cell is ready for charging.

An embodiment of a lithium-ion secondary electrochemical cell in accordance with the teachings herein, cell 10, is depicted in perspective in FIG. 1A and in side cross-section along B-B in FIG. 1B. Cell 10 is pouch cell including a flat electrode assembly, including a separator 12, a positive electrode 14, and a negative electrode 16, together constituting a laminated electrode assembly 18, a flexible pouch 20 (of aluminized foil, e.g., as known in the art), a positive contact 22 and a negative contact 24, contacts 22 and 24 functionally associated with a respective electrode 14 and 16 and accessible from outside pouch 20.

Positive electrode 14 is a substantially flat positive electrode bearing a lithium-ion containing positive active material having an oxidation potential of at least about 4.2 V vs Li/Li+ (e.g., $LiNi_{0.5}Mn_{1.5}O_4$ with an oxidation potential of 4.9 V vs. Li/Li+) on one face.

Negative electrode 16 is a substantially flat negative electrode bearing negative active material (e.g., graphite) on one face.

The various components are made in the usual way as known in the art, see for example Aurbach D et at in *Journal of Power Sources* 2006, 162(2), 780-789. Negative electrode 16, separator 12 and positive electrode 14 are stacked together to constitute laminated electrode assembly 18, where separator 12 is disposed between positive electrode 14 and negative electrode 16, where electrodes 14 and 16 are oriented so that the faces bearing the respective active materials face the separator 12 and so that separator 12 electrically insulates positive electrode 14 from negative electrode 16. Electrode assembly 18 is then placed inside pouch 20. Pouch 20 is then filled in the usual way with electrolyte (and sealed).

Electrode Assembly

An electrochemical cell according to the teachings herein generally comprises a laminated electrode assembly including one or more positive electrode layers (made up of the one or more positive electrodes) and one or more negative electrode layers (made up of the one or more negative electrodes), with the appropriate number of separator layers contained inside a cell-container. Any suitable laminated electrode assembly may be used in implementing the teachings herein. In some embodiments, the electrode assembly comprises a flat electrode assembly. In some embodiments, the electrode assembly comprises a stacked electrode assembly including at least one negative electrode and at least one positive electrode. In some embodiments, the electrode assembly comprises a stacked electrode assembly including a plurality of negative electrodes and a plurality of positive electrodes. In some embodiments, the electrode assembly comprises a jelly-roll (spiral wound) electrode assembly.

Cell Container

The electrode assembly may be placed in any suitable cell-container. In some embodiments, the cell-container is a rigid cell-container while in some embodiments, the cell-container is a flexible cell-container, e.g., a pouch and the cell is a pouch-cell.

Positive Electrode and Positive Active Material

Any positive electrode having a height, a breadth and a thickness and bearing any suitable lithium-ion containing positive active material on at least one face thereof may be used in implementing embodiments of the teachings herein. That said and as discussed above, in some preferred embodiments the positive active material is a positive active material having an oxidation potential of at least about 4.2 V vs. Li/Li+ in order to gain the greatest advantages of the teachings herein, for example because the high oxidation potential generally leads to generation of a substantial amount of interfering multivalent cations and/or to multivalent cations that lead to the formation of more significant flaws in the negative electrode SEI.

In some embodiments, the lithium-ion containing positive active material has an oxidation potential of at least about 4.3 V vs. Li/Li+, at least about 4.4 V vs. Li/Li+, at least about 4.5 V vs. Li/Li+, at least about 4.6 V vs. Li/Li+, at least about 4.7 V vs. Li/Li+ and even at least about 4.8 V vs. Li/Li+.

Known suitable positive active materials include: LiNi$_{0.5}$Mn$_{1.5}$O$_4$ (oxidation potential 4.75 V vs Li/Li+), LiCoPO$_4$ (oxidation potential 4.8V vs Li/Li+), LiNiVO$_4$ (oxidation potential 4.8 V vs Li/Li+), and LiNiPO$_4$ (oxidation potential 5.1V vs Li/Li+).

In some embodiments, the positive active material is selected from the group consisting of spinels and olivines.

In some embodiments, the positive active material comprises manganese ions. Typical suitable positive active materials comprise:

lithium manganese phosphates, for example LiMnPO$_4$; positive active materials known as LNMS (such as LiNiMn-CoO$_2$ and LiNi$_{0.5}$Mn$_{1.5}$O$_4$) having the formula:

$$Li(1+r)Ni(0.5-r)Mn(1.5-x)MxO(4-\delta)T\delta \text{ or } Li(1+r)Ni(0.5)Mn(1.5-x-r)MxO(4-\delta)T\delta;$$

where M represents a cation such as Al, Ti, Cr, Fe, Zn, Mg and the like;
where T represents an anion such as F;
r is between 0 and 0.2;
x is between 0 and 0.2; and
δ is between 0 and 0.2
and positive active materials known as LMS (such as LiMn$_2$O$_4$ and LiMnO$_4$) having the formula:

$$LiMn(2-x)MxO(4-\delta)T\delta,$$

where M represents a cation such as Al, Ti, Cr, Fe, Zn, Mg and the like;
where T represents an anion such as F;
x is between 0.01 and 0.2; and
δ is between 0 and 0.2.

In some embodiments, suitable positive active materials include materials such as lithium metal oxides, lithium nickel oxides, lithium cobalt oxides, lithium iron oxides, LiMnO$_4$, LiNiMnCoO$_2$, LiNiCoAlO$_2$, LiCoO$_2$, LiNiO$_2$, LiCo$_{1-x}$Ni$_x$O$_2$ (0.01≥x≥1), mixtures of LiCoO$_2$ with LiNiO$_2$, LiFePO$_4$, LiFeSO$_4$ and Li$_2$FePO$_4$F, although such materials generally produce less soluble products. In some embodiments, the positive active materials include an amount of other cations, such as cations of Al, Ti, Cr, Fe, Zn, Mg and the like.

In some embodiments, suitable positive active materials include materials such as lithium metal phosphates, (e.g., Li(Mn,Ni,Co)PO$_4$ with any suitable ratio of the different metal cations) including lithium manganese phosphates (e.g., LiMnPO$_4$), lithium nickel phosphates (e.g., LiNiPO$_4$), lithium cobalt phosphates (e.g., LiCoPO$_4$) and lithium nickel manganese phosphates (e.g., LiNi$_{0.5}$Mn$_{0.5}$PO$_4$).

In some embodiments, a positive electrode is between 30 and 350 micrometer thick, typically between 50 and 200 micrometers thick.

Any suitable positive electrode support, such as known in the art, may be used in implementing the teachings herein. Typically, a positive electrode support also acts as a current collector to transport electrons between the positive contact of the cell and the positive active material. Suitable positive electrode-support include meshes, foils and plates of materials such as aluminum, aluminum alloys, gold, gold alloys, platinum, platinum alloys, titanium, titanium, alloys and combinations thereof. In some embodiments, a positive electrode support is permeable to the passage of lithium ions, e.g., a porous micromesh such as a copper micromesh. In some embodiments, a positive electrode support is impermeable to the passage of lithium ions, e.g., a solid copper foil.

In some embodiments, a positive electrode is between 30 and 350 micrometer thick, typically between 50 and 200 micrometers thick.

A positive electrode is generally functionally associated with a positive contact, for example a wire or a strip of conductive material, integrally formed or attached, for example by welding, to the positive electrode support, to transport electrons to and from the positive electrode. A positive contact is generally accessible (electrically contactable) from outside the cell-container of the electrochemical cell.

Any suitable method may be used for producing a positive electrode, for example as described in US patent publication 2008/0254367 or WO 2006/073277. Generally, a positive electrode is made by applying a layer of a slurry comprising the positive active material, a conductive material, a binder and a solvent to at least one face of an electrode-support. The slurry is dried, leaving a layer of positive active material attached to the electrode-support.

For example, powdered positive active material is kneaded together with a conductive material such as acetylene black or carbon black, a binder such as ethylene propylene diene terpolymer (EPDM), polytetrafluoroethylene (PTFE), poly(vinylidene fluoride) (PVDF), styrene-butadiene copolymer (SBR), acrylonitrile-butadiene copolymer (NBR) or carboxymethylcellulose (CMC) to give a positive active material composition. The positive active material composition is mixed with a solvent such as 1-methyl-2-pyrrolidone to form a slurry. At least one face of a positive electrode-support is coated with a layer of the slurry, and the coated electrode-support heated at between about 50° C. and about 250° C. under vacuum for a sufficient time for drying, for example between 1 and 24 hours, providing a positive electrode.

Negative Electrode and Negative Active Material

Any suitable negative electrode having a height, a breadth and a thickness and bearing any suitable lithium intercalating negative active material on at least one face thereof may be used in implementing embodiments of the teachings herein.

In some embodiments, a negative electrode as described herein is between 30 and 300 micrometer thick, typically between 100 and 200 micrometers thick.

Any suitable lithium intercalating negative active material may be used in implementing the teachings herein. Some embodiments include at least one negative active material selected from the group consisting of metals (e.g., tin, aluminum), silicon, silicates, $SnO_2$, $TiO_2$ and intermediary alloys. Some embodiments include at least one negative active material that is a carbonaceous materials (e.g., a lithium-intercalating material that is primarily carbon) such as cokes, graphites, hard carbons, soft carbons, fired organic polymers, carbonaceous fibers or mixtures thereof.

Any suitable negative electrode support, such as known in the art, may be used in implementing the teachings herein. Typically, a negative electrode-support also acts as a current collector to transport electrons between a negative contact of the cell and the negative active material. Suitable electrode-supports include meshes, foils and plates of materials such as copper, copper alloys, nickel, nickel alloys, gold, gold alloys, platinum, platinum alloys, titanium, titanium, alloys and combinations thereof. In some embodiments, a negative electrode support is permeable to the passage of lithium ions, e.g., a porous micromesh such as copper micromesh. In some embodiments, a negative electrode support is impermeable to the passage of lithium ions, e.g., a solid copper foil.

A negative electrode is generally functionally associated with a negative contact, for example a wire or a strip of conductive material, integrally formed or attached, for example by welding, to the negative electrode, to transport electrons to and from the negative electrode. A negative contact is generally accessible (electrically contactable) from outside the cell-container of the electrochemical cell.

Any suitable method may be used for producing a negative electrode, for example as described in US patent publication 2008/0254367 or WO 2006/073277. Generally, a negative electrode is made by applying a layer of a slurry comprising the negative active material, a conductive material, a binder and a solvent to at least one face of an electrode-support. The slurry is dried, leaving a layer of negative active material attached to the electrode-support. For example, powdered carbonaceous negative active material is mixed with a binder such as ethylene propylene diene terpolymer (EPDM), poly-tetrafluoroethylene (PTFE), poly(vinylidene fluoride) (PVDF), styrene-butadiene copolymer (SBR), acrylonitrile-butadiene copolymer (NBR) or carboxymethylcellulose (CMC) to give a negative active material composition. The negative active material composition is mixed with a solvent such as 1-methyl-2-pyrrolidone to form the slurry. At least one face of a negative electrode-support is coated with a layer of the slurry, and the coated electrode-support heated at between about 50° C. and about 250° C. under vacuum for a sufficient time for drying, for example between 1 and 24 hours, providing a negative electrode.

Electrolyte

An electrolyte is the medium that allows migration of lithium ions (and in some embodiments, other ions) into and out of the positive and negative active materials and through the separator. In some embodiments, one or more components of the electrolyte are reduced forming a negative electrode SEI, as described above.

Any suitable electrolyte may be used for implementing the teachings herein such as known in the art, for example a liquid or gel electrolyte solution.

In some embodiments, an electrolyte comprises at least one lithium salt in a non-aqueous solvent including one or more solvent components. Typical lithium salts include lithium salts selected from the group consisting of $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium bis(oxalato)borate (LiBOB), lithium difluorooxalatoborate (LiDFOB) and combinations thereof. In some embodiments, an electrolyte comprises two, three or more different lithium salts. In some embodiments, the concentration of the lithium salts in the electrolyte are between about 0.1 M and about 3 M, in some embodiments between about 0.5 M and about 1.5 M.

In some embodiments, an electrolyte comprises at least one non-aqueous solvent including one or more solvent components. In some embodiments, one or more solvent components are selected from the group consisting of cyclic carbonates such as ethylene carbonate (EC), propylene carbonate (PC), butylene carbonate (BC), and vinylene carbonate (VC); linear carbonates such as dimethyl carbonate (DMC), methyl ethyl carbonate (MEC), diethyl carbonate (DEC), dipropyl carbonate (DPC); lactones such as gamma-butylolactone (GBL); ethers such as tetrahydrofuran (THF), 2-methyl-tetrahydrofuran, 1,4-dioxane, 1,2-dimethoxyethane, 1,2-diethoxyethane, and 1,2-dibutoxyethane; nitriles such as acetonitrile; esters such as methyl propionate, methyl pivalate and octyl pivalate; N-methyl-2-pyrrolidone (NMP), sulfolane and adiponitrile and combinations thereof. In some embodiments an electrolyte comprises a mixture of two, three or more different non-aqueous solvents.

In some embodiments, an electrolyte further comprises one or more additives for modifying the characteristics of the electrolyte such as one or more of increased safety, formation of an advantageous positive electrode SEI and formation of an advantageous negative electrode SEI. In some embodiments, an electrolyte includes at least one SEI forming-additive. Any suitable additive can be used, for example negative-electrode SEI-forming additives known in the art such as described in Abe K et al (*J. Power Sources* 2008, 184, 449-455) and references cited therein, which are included by reference as if fully set forth herin. Typical additives include additives selected from the group consisting of propargyl methyl sulfate (PMS), propargyl methyl carbonate (PMC), allyl methanesulfonate (AMS), vinylene carbonate (VC), 1,3-propane sultone (PS), ethylene carbonate (EC), fluorinated ethylene carbonate (FEC), ethylene sulfite, propylene sulfite, vinylene ethylene carbonate (VEC) and vinyl acetate (VA).

In some embodiments lithium salts are added as SEI-forming additives, for example LiDFOB and LiBOB.

Typically, an electrolyte is made by mixing the different components together.

Separator

Like known electrochemical cells, embodiments of an electrochemical cell described herein comprise a separator positioned between the positive electrode and the negative electrodes and electrically-insulating the positive electrode from the negative electrode. Generally, a separator is a sheet having a height, a breadth, a thickness, is electrically insulating and is permeable to the passage of lithium ions. Typically, there is at least one separator disposed between every positive electrode and negative electrode to prevent physical contact (with concomitant short circuit) of the positive electrode and negative electrode but to allow the passage of lithium ions during charge and discharge of the electrochemical cell.

As noted above, an electrochemical cell according to the teachings herein includes a separator disposed between and electrically insulating a positive electrode from a negative electrode, the separator permeable to lithium ions (when in functional contact with an electrolyte), the separator including a support sheet and on the support sheet, binding functions configured to bind multivalent cations preferentially to lithium ions.

According to an aspect of some embodiments of the invention, there is also provided a membrane suitable for use as a separator in an electrochemical cell, comprising:

a support sheet; and on the support sheet, binding functions configured to bind multivalent cations preferentially to lithium ions, where the membrane is permeable to lithium ions when in functional contact with an electrolyte.

By suitable for use as a separator in an electrochemical cell is meant that the membrane has a suitable shape, dimensions and flexibility, is inert to the electrolyte, and inert to reduction/oxidation in the conditions inside a electrochemical cell, and for embodiments useful for secondary electrochemical cells, is stable to repeated charge/discharge cycles, especially at high voltages found in secondary electrochemical cells.

The mechanism by which the binding functions bind the multivalent cations is any suitable mechanism, in some embodiments by chelation, in some embodiments by intercalation/entrappment.

As noted above, it is preferred that the binding of the binding function to multivalent cations be as efficient as possible so that most, if not all, multivalent cations that migrate from the positive electrode towards the negative electrode bind to the binding functions and do not pass through the separator. At the same time, it is preferred that the separator be sufficiently permeable to lithium ions to allow the cell to have useful charge and discharge rates.

In some embodiments, the multivalent cations include, inter alia, cations of manganese, nickel, iron and cobalt. In some embodiments, the multivalent cations are Mn2+.

In some embodiments, the binding functions include counter ions. In some embodiments, at least 5% and even at least 50% of the counter ions are lithium ions. In some embodiments, at least 95% of the counter ions and even substantially all the counter ions are lithium ions.

That said, according to an aspect of some embodiments of the invention there is also provided a electrochemical cell as described above where the separator is permeable to lithium ions and includes: a support sheet; and on the support sheet, densely-packed cationic functions (in some embodiments in addition to, in some embodiments instead of the binding functions, in some embodiments on the surface of the membrane) configured to repel multivalent cations from the membrane without substantially repelling lithium ions. According to an aspect of some embodiments of the invention, there is also provided a membrane suitable for use as a separator in an electrochemical cell, comprising: a support sheet; and densely-packed cationic functions (in some embodiments in addition to, in some embodiments instead of the binding functions, in some embodiments on the surface of the membrane) configured to repel multivalent cations from the membrane without substantially repelling lithium ions.

As is known in the art, it is preferred that a separator be as thin and porous as possible in order to allow the electrochemical cell to have maximal power density and minimal internal resistance, but the separator must also be physically strong enough to maintain physical integrity to increase electrochemical cell reliability without short-circuits. In some embodiments, a membrane as described herein has a thickness of not less than 10 and even not less than 15 micrometers. In some embodiments, a membrane as described herein has a thickness of not more than about 150 micrometers, not more than about 120 micrometers and even not more than about 100 micrometers. Typically, the membrane is between 15 and 40 micrometers thick. In some embodiments, a membrane as described herein has a porosity of not more than 80%, not more than 60% and even not more than 40%. In some embodiments, a membrane as described herein has a porosity of not less than 10%, not less than 15% and even not less than 20%.

In some embodiments, the support sheet are based on polycondensation and/or vinyl polymers with manganese ion binding functions on the polymer backbone or side chains. Typical such binding functions include carboxylic groups or phosphonic groups alone or in conjunction with others binding fuctions, for example amino or imino groups, that chelate multivalent ions significantly more strongly than lithium ions.

In some embodiments, the support sheet is as above, and in some embodiments are at least partially fluorinated, for example PVDF, PVDF-co-HFP (hexafluoropropylene), fluorinated polysulfone or polyethersulfone.

In some embodiments, the binding functions are found on complexing resins as polymers or particles which are secured to the support sheet with an adhering substrate wherein such an adhering substrate may be of condensation or vinyl polymers preferably at least partially fluorinated and wherein such additives may be but not limited to chelating resins of Amberlite XAD resins or polymers containing iminodiacetic acid or aminoalkylphoshonates, inorganic particles, as an additive to the polymer matrix.

In some embodiments, the membranes comprise (in addition or instead of the binding functions) a dense layer of cationic groups which repel multivalent cations but not monovalent lithium ions from the surface of the support sheet.

In some embodiments, a membrane comprises some or all of the features above, in combination.

A. Polymers that are useful in implementing a support sheet in accordance with the teachings herein include:

1) engineering plastics with aromatic rings in the backbone such as PSU (polysulfone), PES (polyethersulfone), PPS (polyphenylene sulfide), PEEK (polyether ether ketone) and polyphenysulfide made by step-wise polymerization reactions that may be either addition or condensation reactions and where the polymer back bone optionally contains fluorine groups or other halides and oxidant stabilizing groups such as nitro groups.

2) Engineering plastics such as PPO (polyphenylether);

3) non-fluorinated vinyl polymers such as polyethylene, polypropylene and other non fluorinated vinyl polymers; and 4) in some embodiments, fluorinated or at least partially fluorinated vinyl polymers made by chain reaction polymerization of olefins such as polyvinylidene fluoride (PVDF), poly hexafluoropropylene (PHFP), polychlorotrifluoroethylene (PCTF), as well as co- and terpolymers of the above such as PVDF-co-PTFE, PVDF-co-PTFE, PVDF-co-PHFP, PVDF-co-PCTF Also included are selective membranes based on polystyrene homo and copolymers and partially fluorinated polymers alpha substituted and non-substituted tri-fluorinated polystyrenes and B. Binding functions include sulfonic, carboxylic, phosphonic, and other anionic moieties. The functional groups which may act as complexants for multivalent ions such as $Mn^{2+}$, Mn, Ni, Fe and Co include carboxylic and phosphonic groups. When carboxylic acid groups are in special arrangement such as found in but not limited to EDTA or iminodiacetic acid, the carboxylic agents act together to chelate multivalent cations such Mn, Ni, Fe and Co and/or other multivalent ions but generally not for Li ions. Thus groups which may enhance Li ion permeability may on the other hand chelate Mn, Ni, Fe and Co and/or other multivalent ions. In some embodiments, the binding functions of a membrane containing carboxylic and or phosphonic groups are in arrangements which enhance multivalent ion (such as one or more of Mn, Ni, Fe and/or Co) binding, which in some embodiments also enhance Li ion passage. (a lithium-permeation function) In some embodiment the membranes include binding functions such as carboxylic and/or phosphonic groups which chelate multivalent ion (such as one or more of Mn, Ni, Fe and Co) and other groups which do not chelate multivalent ion (such as one or more of Mn, Ni, Fe and Co) but facilitate the passage of Li ions such as sulfonic groups. Two preferred agents for Li ion passage and multivalent ion (such as one or more of Mn, Ni, Fe and Co) ions complexation are derivatives based on iminodiacetic acid and aminoalkylphosphonic acids. Additionally, in some embodiments for retention and/or complexation of multivalent ions (such as one or more of Mn, Ni, Fe and Co) use of vinyl co polymers (such as listed in A4, above) wherein one of the monomers contains carboxylic groups or phosphonic groups; where the vinyl groups that contain carboxylic groups may be such as acrylic acid or methacrylic acid or other monomers with one carboxylic groups and or monomers with two or more carboxylic acid groups such as for example maleic or fumaric acid or maleic anhydride which may be left as-is or hydrolyzed to maleic acid. Additional monomers of unsaturated carboxylic acids (and corresponding anhydrides) suitable for implementing embodiments of this aspect of the invention are listed in US patent publication 2009/0301595 which is included by reference as if fully set forth herein, including suitable methods and processes for polymer grafting and polymerization. Depending on the embodiment, the copolymers may be a random copolymer, alternating copolymer, block copolymer or in some preferred embodiments, grafted copolymers. For example, PVDF polymer with graft maleic anhydride (commercially available, for example, from Arkema) may be used for implementing some embodiments of the invention. The anhydride may be hydrolyzed to a maleic acid with increased complexing ability of multivalent ions (such as one or more of Mn, Ni, Fe and Co). Alternatively or additionally, in some embodiments, graft polymerization or the polymerization in the presence of fluorinated polymers such as PVDF or PVDF copolymers of ionic or potentially ionic monomers is as described in U.S. Pat. No. 6,872,781 which is included by reference as if fully set forth herein. Specifically, from U.S. Pat. No. 6,872,781 "Examples of acrylic resins include polymers (including copolymers, terpolymers, oligomers, and the like) of acrylic acids, methacrylic acids, esters of these acids, or acrylonitrile. Acrylic resins can be formed from polymerizable vinyl containing monomers, including, but not limited to, acrylic acid alkyl esters, methacrylic acid alkyl esters, and the like. The acrylic resin can also contain other repeating units as well as combinations of different acrylic acid alkyl esters, methacrylic acid alkyl esters, acrylic acids, methacrylic acids, and acrylonitriles. Furthermore, the acrylic resin contains at least one ionic (e.g., sulfonate or phosphonate) or ionizable group such as a sulfonated or phosphonated group or sulfonyl groups. An ionizable group is a group capable of forming an ionic group, such as cyclic amino acids, sultones, maleic anhydride, mercaptans, sulfides, phosphalanes, and the like. These groups can be part of the acrylic resin by any means such as blending an acrylic resin in the presence of one or more monomers containing an ionic or ionizable group. In the alternative, one or more of the monomers used to form the acrylic resin can contain the ionic or ionizable group. Besides the components mentioned above with respect to the acrylic resin, the acrylic resin can further contain or be formed in the additional presence of one or more additional monomers optionally with any type of functional group as long as these monomers are compatible with the overall formation of the acrylic resin. Examples of the acrylic acid ester (1) include, for example, ethyl acrylate, methyl acrylate, butyl acrylate, propyl acrylate, isobutyl acrylate, amyl acrylate, 2-ethylhexyl acrylate, hexyl acrylate, fluoroalkyl acrylates, and combinations thereof. Examples of the methacrylic acid ester (2) include, for example, ethyl methacrylate, methyl methacrylate, butyl methacrylate, propyl methacrylate, isobutyl methacrylate, amyl methacrylate, 2-ethylhexyl methacrylate, hexyl methacrylate, fluoroalkylmethacrylate, and combinations thereof".

In some embodiments, the functional groups on the co or block or grafted polymer are be subsequently reacted to further improve the multivalent complexant abilities. For example maleic anhydride, and to a lesser extend maleic acid or fumaric acid may be reacted through the respective anhydride or carboxylic acid groups with the amino groups on complexants such as, but not limited to, iminodiacetic acid or amino alkyl phosphonic acid to form amide derivatives with enhance complexation of multivalent ions (such as one or more of Mn, Ni, Fe and Co).

In some embodiments, a membrane contains a mixture of polymers which include a backbone having a —$CH_2$—$CF_2$— unit such as but not limited to PVDF or PVDF-co-HFP with other polymers which contain the chelating groups as for a non limiting example polystyrene-co-maleic anhydride or maleic acid or derivatives with iminodiacetic acid, an additional compatibilizing polymer such as, but not limited to, polymethylmethacrylate or acrylate or polyvinylpyrrolidinone or other polymers with carbonyl groups in sufficient conconcentration to be compatible with PVDF, increasing the adhesion thereto. The compatibilizing polymer may be used to help compatibilize (increasing the mutual adherance of) the support sheet PVDF-containing polymers with polymers bearing the binding functions. In some embodiment polymers bearing the binding functions are co-, block or grafted polymers wherein at least one of the other monomers may contain compatibilizing groups for the PVDF such as polymethylmethacrylate or acrylate or polyvinylpyrrolidinone.

The concentration of the binding functions is preferably relatively high. An exact value is embodiment-dependent and can be determined by a person having ordinary skill in the art without undue experimentation upon perusal of the disclosure herein. In some embodiments the concentration is higher that 1%, and preferably between 5 and 10%.

C) In some embodiments, the membrane comprises a support sheet, for example of polymer with Li ion permeating groups and particles bearing the binding functions such as particulate resins of known multivalent cation chelators such as resins based on crosslinked polystryrene with groups of iminodiacetic acid and aminoalkylphosphonic groups. There are numerous types of resins known in the art used for complexing multivalent ions but not mono valent ions and these are included herein. Many are based on iminodiacetic acid and aminoalkylphosphonic groups, but not only, and on a particle matrix which maximizes complexation, capacity and stability (see for example, U.S. Pat. No. 5,804,606). In some embodiments, the particles are organic, in some embodiments inorganic, and in some embodiments hybrid.

Membrane Porosity

As noted above, in some embodiments, a membrane as described herein has a porosity of not more than 80%, not more than 60% and even not more than 40%. In some embodiments, a membrane as described herein has a porosity of not less than 10%, not less than 15% and even not less than 20%. In some embodiments, the membrane is dense. Depending on the embodiment, the pore size of the porous membranes is from micrometer to submicrometer to nanometer sized pores. In some embodiments, a membrane has nanometer-sized void spaces. In some embodiments the pore size is larger than lithium or multivalent ion. Such membranes typically include the binding functions on the outer surface of the membrane as well as inside the pores. Preferably, the optimum porosity is found to maximize Li ion permeability and maximizing multivalent cation binding and retention. Depending on the embodiment, some such characteristics include deciding on electrochemical cell parameters such as current density, voltage (e.g., up to about 5.5 V) to achieve a sufficiently long cell lifetime and cyclability.

Membrane Composition

In some embodiment the membrane comprises a single homo, co, block or graft type polymer with the binding functions and optionally, lithium-permeation functions, where the functions may be the same or different. In some embodiments, the membrane comprises at least two different polymers each including the same or different functions which in one case is lithium-permeation functions and another group or the same groups on another polymer which is a binding function. Alternatively the polymers may be of the same backbone structure wherein the lithium-permeation functions and the binding functions are on different polymer molecules of the same basic polymer structure. It can be appreciated that the membrane may contain more than one type of binding function and/or more than one type of lithium-permeation functions. In some embodiments, the functions are distributed homogenously through the thickness of the membrane. In some embodiments, a membrane comprises layers, the layers including different functions. In some embodiments, a membrane comprises two layers containing two or more different functions. In some embodiments, a membrane comprises more than two layers with alternating same functions or different functions.

Some embodiments are dense or solvent swollen membranes which include cationic groups on at least one of the surfaces such as quaternary ammonium salts that more readily exclude the permeation through the membrane surface of multivalent Mn ions by electrostatic repulsion, while the single valent Li ions are not substantially repelled. Such cationic groups are optimally placed on the surface of the membrane. Such membranes may be dense membranes which such groups on the membrane surface. In some embodiments, the membrane is of two or more layers wherein in at least one of the surfaces of the membrane is a dense layer with the cationic charge and the remainder of the membrane is porous.

Some embodiments of the membrane comprise at least one dense surface layer bearing repelling functions and a subsequent layers comprises binding functions and lithium permeation functions and/or binding functions. The layers after the dense outer layer containing the cationic groups may be either dense or porous. By dense in all cases it is meant also layers that may also be swollen by solvent.

In some embodiments the membrane also contain additional polymers devoid of binding functions and lithium permeation functions, wherein the additional polymers provide desired properties such as strength and or flexibility.

Polymer Selection

The polymer materials for making the membrane are chosen for stability and inertness to the conditions inside an electrochemical cell, in some embodiments, an electrochemical cell operating at 4.5 V and higher. In some embodiments, polymers are chosen from engineering plastics and fluorinated or per fluorinated polymers.

In some embodiments, the polymer for implementing the teachings herein, for example, making up the supporting structure is chosen from the group of a condensation polymer derived from polyphenylsulfone or polysulfone or polyethersulfone, or polyetheretherketone. That said, in some embodiments the polymer is selected from the group consisting of: polymers made from condensation polymerization, such as polysulfone, polyether sulfone, polyphenylsulfone, polyphenylene sulfone, poly-ether-ketone, polyether-ether-ketone, polyether ketone-ether-ketone, polyphenylene sulfide, polyphenylene sulfone and variations of sulfide and sulfone in the same polymer and other variations of polyether ketones and poly-sulfone. A non limiting list of polymers from which the ionic polymers may derived from a polysulfone (PSU), polyphenylene oxide (PPO), polyphenylene sulfoxide (PPSO), polyphenylene sulfide (PPS), polyphenylene sulfide sulfone (PPS/SO2), poly-para-phenylene (PPP), poly-phenyl-quinoxaline (PPQ), poly-aryl-ketone (PK) and polyetherketone (PEK) polymer, polyethersulfone (PES), polyether-ether-sulfone (PEES), polyarylethersulfone (PAS), polyphenylsulfone (PPSU) and poly-phenylene-sulfone (PPSO2) polymer; the polyimide (PI) polymer comprises a polyetherimide (PEI) polymer; the polyether-ketone (PEK) polymer comprises at least one of a polyether-ketone (PEK), polyether-ether-ketone (PEEK), polyether-ketone-ketone (PEKK), polyether-ether-ketone-ketone (PEEKK) and poly-ether-ketone-ether-ketone-ketone (PEKEKK) polymer; and the polyphenylene oxide (PPO) polymer comprises a 2,6-diphenyl PPO or 2,6-dimethyl PPO polymer. Polyether-ketone polymers may include polyether-ketone (PEK), polyether-ether-ketone (PEEK), polyether-ketone-ketone (PEKK), polyether-ether-ketone-ketone (PEEKK) and poly-ether-ketone-ether-ketone-ketone (PEKEKK) polymers. In some embodiments, enhanced oxidant stability for these polymers is achieved where some of the aromatic polymer backbone contain halogens, for example Fl, Cl or Br, and/or nitro groups. Direct halogenation on the aromatic ring may also be used to increase stability (U.S. Pat. No. 7,550,216). These aforementioned polymers may also be made from fluorinated monomers to form at least partially fluorinated polymers.

Polymers useful for implementing the teachings herein, for example, making up the supporting structure, may also be chosen from fluorinated polymers made by chain reaction polymerization examples of such fluorinated polymers are: polyvinylidene fluoride (PVDF), poly hexafluoropropylene (PHFP), polychlorotrifluoroethylene (PCTF), as well as co- and terpolymers of the above such as PVDF-co-PTFE, PVDF-co-PTFE, PVDF-co-PHFP, PVDF-co-PCTF. Poly (perfluoro dioxoles) as a homopolymer and copolymers with other fluorinated monomers such as vinylidene fluoride or tetra-fluoro ethylene. Also included are partially fluorinated polymers alpha substituted and non-substituted tri-fluorinated polystyrenes. Examples of commercial sources of some of these polymers include: Solvay SA (Ixelles, Brussels, Belgium), Imperial Chemical Industries (London, England, UK) and BASF SE (Ludwigshafen, Germany). Examples of suitable polymers available from Solvay SA include: UDEL™ polysulfone, RADEL™ polyether sulfone and RADEL™ R polyphenylsulfone, as well as SOLEF™ fluoropolymer.

In some embodiments, polymers are derivatized to include the lithium-permeation functions, and in some embodiments, also the binding function. For example cationic exchange groups on polymers that may be synthesized to enhance Li ion permeation of a membrane may be selected from, $-PO_2H_2$, $-CH_2PO_3H_2$, $-COOH$, $-OPO_2H_2$, $-OPO_3H_2$, $-OArSO_3H$ and sulfonic groups ($-SO_3H$). The sulfonic, the phosphorous containing groups and the carboxylic acid groups within a polymer matrix will function as lithium-permeation functions, increasing Li ion permeation through the membrane while phosphorous and carboxylic acid groups serve at least partially as bindng functions. Examples of phosphonates preparation may be found in Solid State Ionics, 97 (1997), 177-186. Examples of carboxylated solid polymer electrolytes preparation may be found in Solid State Ionics, 40:41 (1990), 624-627. Examples of methods for the preparation of sulfonated derivatives of at least one thermoplastic aromatic polymers may be found in U.S. Pat. Nos. 4,413,106, 5,013,765, 4,273,903 and 5,438,082, and Linkous, et al., J. Polym. Sci., Vol. 86: 1197-1199 (1998). Some other non-limiting examples of polymers with these cationic exchange groups (in effect anionic groups) and the degree of substitution include: derivitized polyphenylsulfone 0.4 to 2.0 meq/gr, derivatized polysulfone 0.4, to 1.8 meq/gr, derivatized polyether sulfone 0.6, to 1.4 meq/gr, derivatized polyether ether ketone 1.0 to 3.0 meq/gr, derivatized polyether ketone 0.8 to 2.5 meq/gr. The counter ions of the ionomer ionic groups, are preferably Lithium ions.

Examples of suitable binding functions include, but are not limited to, amino alkyl phosphonic acid iminodiacetic acid, nitrilodiacetic (NDA), nitrilotriacetic acid (NTA), ethylenediaminetetraacetic acid (EDTA), N,N'-bis(2-hydroxyphenyl) ethylenediiminodiacetic acid (HPED), triethylenetetranitrilohexaacetic acid (TTHA), desferriferrioxamin B, N,N', N"-tris[2-(N-hydroxycarbonyl)ethyl]-1,3,5-benzenetricarboxamide (BAMTPH), ethylene diamine diorthohydroxyphenylacetic acid (EDDHA), ethylene diamine tetramethylenephosphonic acid (EDTMP), propylenediaminetetraacetic acid (PDTA), hydroxypropylenediaminetetraacetic acid (HPDTA), isoserinediacetic acid (ISDA), .beta.-alaninediacetic acid (.beta.-ADA), hydroxyethanediphosphonic acid, diethylene triaminetetraacetic acid, diethylene triamine tetramethylenephosphonic acid, hydroxy ethyleneaminodiacetic acid, hydroxyethylethylenediaminetriacetic acid, diethylene triaminepentaacetic acid, diethanolglycine, ethanolglycine, citric acid, glycolic acid, glyoxylic acid, lactic acid, phosphonic acid, glucoheptonic acid, tartaric acid, polyacrylates, carbonates, phosphonates and gluconates, aminopyridines, maleic anhydride, maleic acid and fumarid acid. Two preferred agent, but not only, which may be readily bound to different polymers are aminoalkylphosphonic acid and iminodiacetic acid.

There are numerous methods known in the art for attaching binding functions to polymers as for example described in (but not limited to) US patent applications 2010/0261289, 2010/0069293 and 2009/0107520 and U.S. Pat. Nos. 5,804, 606 and 4,098,867 which methods are included by reference as if fully set forth herein.

One preferred method is the binding of iminodiacetic acid or aminoalkylphosphonic via alkyl halogens such as halomethylated groups attached to an alkyl or an aromatic ring of a polymer backbone. Examples of the latter are halomethylated aromatic condensation polymers such as polysulfone, polyphenylsulfone or polyetheretherketones and the like, or halomethylated polyphenylene oxide such as 2,6 dimethylpolyphenylene oxide. Another polymer is halomethylated polystyrenes and derivatives thereof.

For example in U.S. Pat. No. 5,804,606 binding functions of either iminodiacetic acid or aminoalkyl phosphonic acid are attached to crosslinked polystyrene from the chloromethylation, amination, hydrolysis and methylphosphonation of a macroporous copolymer produced by the polymerization of styrene, divinylbenzene and trimethylolpropanetrimethacrylate in the presence of the phase extender MIBC (4-Methyl 2-pentanol). Similarly an iminodiacetic acid resin, was made by chloromethylating then aminating, hydrolyzing and reacting with chloroacetic acid, amacroporous copolymer produced by the polymerization of styrene, divinylbenzene and trimethylolpropanetrimethacrylate in the presence of the phase extender MIBC (4-Methyl 2-pentanol).

In one preferred embodiment binding functions are bound to aromatic engineering polymeric plastic with benzyl halide groups such as chloro or bromomethylated poly aromatic engineering plastic such as 2,6 dimethyl polyphenylene oxide or chloro or bromo methylated aryl polyarylsulfones or polyetherketones.

In some embodiments, the halomethylated polymers are chosen from the following polymers: polymers made from condensation polymerization, such as polysulfone, polyether sulfone, polyphenylsulfone, polyphenylene sulfone, polyether-ketone, polyether-ether-ketone, polyether ketone-ether-ketone, polyphenylene sulfide, polyphenylene sulfone and variations of sulfide and sulfone in the same polymer and other variations of polyether ketones and poly-sulfone. Thus, some of the categories of the preferred ionic polymers may be derived from a polysulfone (PSU), polyphenylene oxide (PPO), polyphenylene sulfoxide (PPSO), polyphenylene sulfide (PPS), polyphenylene sulfide sulfone (PPS/SO2), poly-para-phenylene (PPP), poly-phenyl-quinoxaline (PPQ), poly-aryl-ketone (PK) and polyether-ketone (PEK) polymer, polyethersulfone (PES), polyether-ether-sulfone (PEES), polyarylethersulfone (PAS), polyphenylsulfone (PPSU) and poly-phenylene-sulfone (PPSO2) polymer; the polyimide (PI) polymer comprises a polyetherimide (PEI) polymer; the polyether-ketone (PEK) polymer comprises at least one of a polyether-ketone (PEK), polyether-ether-ketone (PEEK), polyether-ketone-ketone (PEKK), polyether-ether-ketone-ketone (PEEKK) and polyether-ketone-ether-ketone-ketone (PEKEKK) polymer; and the polyphenylene oxide (PPO) polymer comprises a 2,6-diphenyl PPO or 2,6-dimethyl PPO polymer. Preferred polyether-ketone polymers include polyether-ketone (PEK), polyether-ether-ketone (PEEK), poly-ether-ketone-ketone (PEKK), polyether-ether-ketone-ketone (PEEKK) and polyether-ketone-ether-ketone-ketone (PEKEKK) polymers. Vinyl polymers containing monomers with polystyrene which may be halomethylated or 4-methyl polystyrene which may be further halogenated on the methyl group can also be used. Methods of introducing halomethyl groups into the aforementioned polymers are well known in the art.

The binding functions with reactive amines may be attached directly via a methyl group on the aromatic backbone or via a longer alkyl chain originating from the polymer backbone. In another approach polymers with a halomethylated groups attached to the polymer backbone may be first reacted with multifunctional amines such as ethylene diamine, triethylene pentamine or tetraethylene pentamine to introduce multifunctional amines. These may then be reacted according to the procedures described in U.S. Pat. No. 5,804,606 to attach either multi iminodiacetic acid or aminoalkyl phosphonic.

In some embodiments, graft polymerization may be used to introduce more than one type of group or moiety. As for example sulfonic groups with phosphonic and or carboxylic acid groups may be forms. Formation of graft polymers with such groups is well known in the art. These graft groups may also be combined with binding functions such as iminodiacetic acid or aminoalkyl phosphonic attached to the graft polymers.

In another embodiment aromatic condensation polymers or vinyl polymers with carboxylic acid groups and anhydrides thereof may be further derivatized to add binding functions with for examples iminodiacetic acid or aminoalkyl phosphonic and other amino containing complexants, through the amino group to form an amide linkage with the polymer.

The binding functions and/or lithium-permeation functions can be chemically attached to a polymer support sheet or to a polymer that adheres to the support sheet by graft polymerization of monomers onto the membrane matrix. The grafted monomers are optionally further derivatized or already contain the binding functions and/or lithium-permeation functions. For graft polymerization the preferred polymers upon which the grafting is carried out are in one embodiment vinyl polymers chosen from polyolefins, especially polyethylene and polypropylene and especially preferred perfluorinated or partially fluorinated polymers as for example (but not limited to), poly(tetrafluoroethylene-co-hexafluoropropylene), polyvinylidene fluoride, and polytetrafluoroethylene (PTFE), and preferably poly(ethylene-co-tetrafluoro ethylene) and poly(tetrafluoroethylene-co-hexafluoropropylene). The monomers that may be grafted are acrylic acid, methacrylic acid, vinylacetic acid, vinylbenzoic acid, and other vinyl monomers containing carboxylic groups such as maleic anhydride, maleic acid and fumaric acid. Other preferred monomers are vinylphosphonic acid, styrene phosphonic acid and vinylsulfonic acid and styrene sulfonic acid and other monomers containing either phosphonic or sulfonic groups. Additional or stronger binding functions may be added to carboxylic acid groups found in the chains made from acrylic, methacrylic acid, maleic anhydride, maleic acid or fumaric acid by reacting the carboxylic acid of these such monomers with, but not limited to iminodiacetic acid or amino alkyl phosphonic acid via the amine groups to form amide derivatives with enhanced binding ability (by complexation) to multivalent ions. For attaching binding functions such as iminodiacetic acid or aminoalkyl phosphonic the grafting of halomethylated styrene, or monomers which can be converted to halomethylated or haloalkylated styrene after grafting to the matrix polymers derived by the graft polymerization of styrene and vinyltoluene. After graft polymerization of the monomers subsequent reactions may be halomethylation, sulfonation, phosphonation, amination, carboxylation. Wherein halomethylation and aminating may further undergo well know additional reaction to introduce may be further followed iminodiacetic acid or aminoalkyl phosphonic. In other embodiments the grafted monomers may coating amino groups such as vinyl aniline or vinyl allyl amine which may be further derivatized after grafting to introduce the necessary groups that constitute binding functions or lithium-permeation functions.

Grafting may preferably be carried out by free radical initiators or by radiation grafting. The process of grafting may also bring about crosslinking of the matrix polymer as well as the grafted polymer. In the grafting reaction, the polymeric base film is treated with the monomer(s) in the liquid phase, either as a neat liquid or in a solution. Alternatively, the polymeric base film may be treated with a mixture of liquid and vapor phase monomer(s) (including aerosols), or with monomer(s) in the vapor phase only. It can be advantageous to select a solvent that will cause the solution to penetrate the base film and cause it to swell. This facilitates grafting of the monomer(s) throughout the membrane thickness. Preferably the free radical processes and/or the irradiation and grafting process is carried out in an inert atmosphere.

The reaction conditions may be selected so as to introduce crosslinking between monomer units during graft polymerization or subsequent thereto. Crosslinking may be introduced into polymeric membranes where it is, for example, desirable to increase dimensional stability, reduce swelling, modify chemical and/or mechanical properties, or enhance the ion-exchange efficiency. Methods of preparing crosslinked graft polymeric membranes are known in the art. For example, U.S. Pat. No. 5,656,386 describes adding a crosslinking agent to vinyl monomers to be grafted to a membrane film, wherein the radiation grafting and crosslinking reactions occur simultaneously. The methods of grafting described in U.S. Pat. No. 6,723,758 are included by reference as if fully set forth herein. As for example as in U.S. Pat. No. 6,723,758 the use of substituted TFS and/or TFN monomers to be grafted contain a phosphine, phosphite, or thioether substituent. These substituents are activating with respect to the graft polymerization reaction. Ion-exchange groups such as, for example, sulfonate, may then be introduced into the aromatic ring of the substituted TFS and/or TFN monomer units after graft polymerization. Then, following graft polymerization the phosphine, phosphite or thioether groups can be oxidized to produce phosphine oxides, phosphones, phosphonates, sulfoxides, or sulfones. Methods suitable for such oxidations are well known to those skilled in the art. The resulting phosphine oxides, phosphones, phosphonates, sulfoxides and/or sulfones are de-activating, thus making the introduced ion-exchange groups, in particular sulfonate groups, more stable under certain conditions.

In some embodiments, the preparation of polymers with lithium-permeation functions or binding functions is carried out by vinyl polymerization with functional groups that containing lithium-permeation functions such as for example vinyl sulfonic monomers with sulfonic groups and for binding function monomers with such groups as carboxylic acid groups such as acrylic, methacrylic, maleic anhydride, maleic acid or fumaric acid which carboxylic acid groups may optionally be further reacted but not limited to iminodiacetic acid or amino alkyl phosphonic acid via the amine groups to form amide derivatives with enhanced binding function.

Some embodiments comprise polymer blends wherein the polymers described in the different sections hereinabove are blended together such that polymers bearing lithium-permeation functions are blended with polymers bearing binding functions. Such embodiments can be formulated by a person having ordinary skill in the art upon perusal of the description herein to achieve the desired degree of Li ion permeation and prevention of multivalent cation passage through the membrane. In some embodiments, such polymers are blended with a neutral polymer which acts as a matrix for enhanced stability (mechanical, chemical and/or physical) and/or adhesiveness to the electrode.

In some embodiments the polymer films described herein are a middle film with films either porous or highly permeable to Li ions on either side which act to prevent contact of the aforementioned middle film with the electrode materials to prevent breakdown at high voltage. Non limiting examples of such outer films are based on PVDF and PVDF-co-HFP.

Separator and Membrane

In the art, a separator useful for implementing an electrochemical cell is preferably microporous and does not require swelling by the electrolyte to achieve Li ion permeablity. In contrast, in the art some membranes are dense and requires swelling by the electrolyte for sufficient permeability of the Li ion. In both cases, separators and membranes may contain binding functions.

As used herein, both porous separators and dense but swollen membranes are considered as multifunctional separators or membranes with the two terms being used interchangeably. In two non limiting embodiments, the dense membrane/separator is cast or extruded to give a dense film while the more porous membrane/separator may be of nonwoven or woven fibers or may be prepared by phase inversion. Porous structures may also be made by well known methods requiring stretching of intact films to form micro cracks or divisions that function as pores.

As described above in some embodiments, a membrane as described herein bears polymers with binding functions or with groups that may react to form or attach binding functions. In some embodiments of nonwoven or woven membrane, the constituent fibers are made from condensation polymerization and preferable vinyl polymers which in one preferred embodiment comprise fluorinated polymers such as tetrafluoroethylene, polyvinylidene fluoride (PVDF) or copolymers such as PVDF-co-TFP. In some embodiments, a nonwoven membrane may be made with a combination of at least two different types of fibers where one of type of fibers bears binding functions or precursors to binding functions. For example a non-woven membrane may be made of PVDF fibers and fibers from a polymer with maleic anhydride as for example polystyrene-co-maleic anhydride. After the porous nonwoven membrane of the two polymers is formed, it is hydrolyzed to maleic acid which may act as a binding function. The binding function may be further enhanced by further derivatizing the maleic acid with for example iminodiacetic acid as described above. In embodiments of porous membranes made by stretching intact films to form micro cracks or divisions may be also be made of at least two polymers wherein one of the polymers contains a binding function of a precursor thereof.

According to an aspect of some embodiments of the invention, there is also provided a battery including at least one electrochemical cell as taught herein, typically by combing two or more electrochemical cells as described herein in the usual way.

EXAMPLES

Reference is now made to the following examples, which together with the above description illustrate some embodiments of the invention in a non-limiting fashion.

To test various embodiments of separators as taught herein, secondary electrochemical cells according to the teachings herein including a separator as taught herein as well as comparable reference secondary electrochemical cells were prepared and compared.

Each electrochemical cell, similar to the depicted in FIG. 1, was (or is) prepared in the usual way as known in the art and included (or includes) a positive electrode, a negative electrode and a separator sandwiched between the two electrodes, saturated with an electrolyte solution and sealed inside an aluminized pouch. The electrochemical cells were (or are) tested using methods analogous to the known in the art with the appropriate modifications, for example as described in Gnanaraj J S (*Electrochem. Comm.* 2003, 5, 940-945), in Aurbach D et al (J Power Sources 2006, 162(2), 780-789), Abe K et al (*J. Power Sources* 2008, 184, 449-455) and US 2008/0254367 which are included by reference as if fully set-forth herein.

Unless otherwise stated, materials and reagents are available from Sigma Chemical Company (St. Louis, Mo., USA), Ube Industries Ltd. (Tokyo, Japan) and Hitachi Chemical Co., Ltd. (Tokyo, Japan).

Positive Electrode for Lithium Ion Secondary Electrochemical Cells

A positive active material slurry composition was (or is) prepared in the usual way with 86 parts powdered $LiNi_{0.5}Mn_{1.5}O_4$ (oxidation potential 4.75V vs Li/Li+ as described in Aurbach D using a self-combustion reaction) as a positive active material, 7 parts carbon black (Super P® from by TIMCAL Ltd., Bodio, Switzerland) and 7 parts PVDF (polyvinylidene fluoride, 10% in NMP) as a binder. About 30% additional NMP (N-methyl-2-pyrrolidone) was (or is) added to achieve a workable viscosity.

One face of a 3 cm by 3.5 cm square of 20 micrometer thick aluminum foil positive electrode-support and current collector with an ultrasonically welded nickel tab (100 micron thick, 3 cm long, 0.5 cm wide) positive contact was (or is) coated with a 60-80 micrometer thick layer of the positive active material slurry composition giving a positive active material loading of 20-25 milligram/cm$^2$. The positive electrode was (or is) densified in the usual way using a rolling mill. The densified positive electrode was (or is) dried under vacuum at 100° C. for 20 hours.

Negative Graphite Electrode

A negative active material slurry composition was (or is) prepared in the usual way with 90 parts graphite (Hitachi SMG-N-ET1-20) as a negative active material, 3 parts carbon black and 7 parts PVDF (polyvinylidene fluoride, 10% in NMP) as a binder. About 30% additional NMP (N-methyl-2-pyrrolidone) was (or is) added to achieve a workable viscosity.

One face of a 3 cm by 3.5 cm square of 10 micrometer thick copper foil electrode-support and current collector with an ultrasonically welded nickel tab (100 micron thick, 3 cm long, 0.5 cm wide) negative electrode contact was coated with a 50 micrometer thick layer of the negative active material slurry composition giving a negative active material loading of 8-10 milligram/cm$^2$. The negative electrode was densified in the usual way using a rolling mill. The densified negative electrode was dried under vacuum at 100° C. for 20 hours.

Pouch Cell

An electrode assembly was (or is) fashioned by placing a 3 cm by 3.5 cm separator (as described below) against the face of the negative electrode bearing the negative active material layer and then placing the face of the positive electrode bearing the positive active material against the separator, so that the separator was (or is) sandwiched between the positive and negative electrodes.

A lithium-ion secondary electrochemical cell was (or is) made by placing the electrode assembly in an aluminum laminate pouch and the pouch filled under vacuum with liquid electrolyte (equal volumes of EC/EMC/DMC with 1M $LiPF_6$) in the usual way to saturate the separator, the positive electrode and the negative electrode with electrolyte, and then sealing the pouch with the electrode contacts protruding therefrom.

Separators O of HFP/PVDF

An amount (depending on the batch, 1% or 5% by weight, see below) of Hexafluoropropylene (HFP) copolymer of PVDF (Solef®, Sigma-Aldrich catalog No 42, 716-0) as an adhering substrate was dissolved in a chloroform/acetone (1:1) solution to yield a viscous solution.

An amount of organic particles bearing a binding function (Amberlite ion-exchange resin having an average particle size of 100 nanometer) was added to the solution to yield a viscous slurry. The amount added was so that the weight of Amberlite added was equal to 40% (6/15) of the weight of PVDF-co-HFP in the solution.

Sheets (3.0 cm by 3.5 cm) of microporous PVDF (60% porosity, 25 micrometer thick from Porous Power Technologies LLC, Colorado, USA) as support sheets were dip-coated with the slurry in the usual way, specifically, completely immersed in the slurry and mechanically drawn out of the slurry at a constant draw rate of 10 cm/minute. into humid air. In the usual way, the chloroform and acetone evaporated from the slurry so that the copolymer adhered to the membrane sheets as a porous layer (through phase-inversion) in which the particles bearing the binding function were entrapped and thereby adhered to the support sheet. After complete evaporation of the chloroform and acetone, the resulting porous separator sheets were between 30 and 35 micrometers thick. The weight ratio of the PVDF sheets to PVDF-co-HFP to Amberlite were 75%-80%:15-20%:5-10%.

Impedance of Separators O 6 electrochemical cells were made, each one of the 6 including two identical graphite electrodes and an electrolyte (EC:EMC (1:3); 1M $LiPF_6$).

2 of the 15 electrochemical cells had one sheet of separator O as described above, one electrochemical cell each including a single separator O sheet made in the 1% or 5% PVDF-co-HFP/Amberlite slurry.

2 of the 15 electrochemical cells had two sheets of separator O as described above, one electrochemical cell each including two separator O sheets made in the 1% or 5% PVDF-co-HFP/Amberlite slurry.

2 of the 15 electrochemical cells had three sheets of separator O as described above, one electrochemical cell each including three separator O sheets made in the 1% or 5% PVDF-co-HFP/Amberlite slurry.

The impedance of each one of the 6 electrochemical cells was measured in the usual way at 1 kHz alternating current. The measured impedances of the three electrochemical cells corresponding to each batch of separators (1% or 5% PVDF-co-HFP/Amberlite slurry) were plotted against the number of layers of separator O.

The impedances of the separators O determined from the slope of each respective plot were:

| | | |
|---|---|---|
| 1% PVDF-co-HFP/Amberlite slurry | 0.21 ohm = 1.2 mS/cm | (T = 25micron) |
| 5% PVDF-co-HFP/Amberlite slurry | .46 ohm = 0.76 mS/cm | (T = 35micron) |

In EC:EMC (1:3); 1M $LiPF_6$ and separator W×L×T=3×3.5×T

Such impedances compare favorably with impedances of the electrolyte that is 7.8mS/cm.

Selectivity of Separators O 9 electrochemical cells were made, each one of the 18 including a positive electrode with LiMNS positive active material, a graphite negative electrode, electrolyte (equal volumes of EC/EMC/DMC with 1M $LiPF_6$) and a single sheet of separator.

3 of the 9 electrochemical cells were reference cells that included a separator made of a sheet of PVDF microporous membrane (60% porosity, 25 micrometer thick from Porous Power Technologies LLC, Colorado, USA).

3 of the 9 electrochemical cells included a sheet of separator O made in the 1% PVDF-co-HFP/Amberlite slurry and 3 of the 9 electrochemical cells included a sheet of separator O made in the 5% PVDF-co-HFP/Amberlite slurry, as described above.

All 9 electrochemical cells were fully charged at 4.8 V. After charging, the cells were stored at 60° C.

After a week of storage, the cells were disassembled in an inert atmosphere ($N_2$), the negative electrode recovered and placed in a 5 ml of triple distilled water.

After a week, the ion content of the 18 water samples was analyzed with atomic absorption spectroscopy using a Profile Plus ICP (Teledyne Technologies, Hudson, N.H., USA).

| | Lithium (ppm) | Manganese (ppm) |
|---|---|---|
| reference separator | 77700 | 100 |
| 1% PVDF-co-HFP/Amberlite slurry | 77700 | 70 |
| 5% PVDF-co-HFP/Amberlite slurry | 77700 | 40 |

The results show that a separator as described herein significantly reduces the amount of Manganese that is dissolved from the positive electrode and passes through the separator to be deposited on the negative electrode.

Cycle-life of Electrochemical Cells Including Separator O 9 electrochemical cells were made, each one of the 9 including a postive electrode with LiMNS positive active material, a graphite negative electrode, electrolyte (equal volumes of EC/MC/DMC with 1M $LiPF_6$) and a single sheet of separator.

3 of the 9 electrochemical cells were reference cells that included a separator made of a sheet of PVDF microporous membrane (60% porosity, 25 micrometer thick from Porous Power Technologies LLC, Colorado, USA).

3 of the 9 electrochemical cells included a sheet of separator O made in the 1% PVDF-co-HFP/Amberlite slurry and 3 of the 9 electrochemical cells included a sheet of separator O made in the 5% PVDF-co-HFP/Amberlite slurry.

The cycle life of all 9 electrochemical cells was tested at 45° C. The charge (to 4.85V) and discharge (to 4.0V) rates were 20-30 mA (C/3) with typical cell capacity of 60-90 mAh.

The reference cells were reduced to 65% capacity after an average of 30 cycles.

All the electrochemical cells including a separator O maintained greater than 80% capacity after 70 cycles and 95% after 30 cycles.

Other Positive Active Materials and Electrolytes

The above is repeated using other positive active materials, including Manganese-ion containing active materials such as managanese spinels and/or other electrolytes (other solvents and/or lithium salts).

Separator Oa

The described above with reference to Separator O and variants thereof is repeated where the amount of Hexafluoropropylene (HFP) copolymer of PVDF in the viscous solution is between 0.5% and 6% by weight.

Separator Ob

The described above with reference to Separator O and variants thereof is repeated where the solvent in the viscous solution includes different proportions of acetone, chloroform, and other suitable organic solvents in addition to/instead of the acetone and chloroform.

Separator Oc

The described above with reference to Separator O and variants thereof is repeated where the amount of particulate chelator in the viscous slurry is varied between 0.1% to 10% by weight and/or the size of the particles is varied between 10 and 1000 nanometers and/or the identity of the chelator particles is varied (e.g., other types of amberlite, ion-exchange resins other than amberlite, bentonite, zeolite).

Separator Od

The described above with reference to Separator O and variants thereof is repeated where the support sheet is of different porosity (30% to 90%) and/or different thickness (15 to 40 micrometer).

Separator Oe

The described above with reference to Separator O and variants thereof is repeated where the humidity of the air into which the sheet is drawn is different and/or the atmosphere into which the sheet is drawn is different (air, nitrogen) and/or the draw rate of the membrane from the viscous slurry is different (1 cm/minute to 60 cm/minute) and/or the thickness of the resulting separator sheet is different (between 25 and 45 micrometers).

Separator Of

The described above with reference to Separator O and variants thereof is repeated where the viscous slurry is applied to the membrane using a method different from dip coating, for example, smearing.

Separator Og

The described above with reference to Separator O and variants thereof is repeated where the adhering substrate is different from HFP copolymer of PVDF and/or the membrane is of a material different from PVDF (e.g., polytetrafluoroethylene (PTFE), polyethylene (PE), polypropylene (PP)), with the caveat that the adhering substrate is sufficiently adhesive to the membrane.

Additional embodiments of separators as described herein were also prepared, used in fashioning an electrochemical cell as described herein, and compared to comparable electrochemical cells including a 3.0 cm by 3.5 cm separator of polypropylene microporous membrane (35% porosity, 30 micrometer thick from Celgard LLC, Charlotte, N.C., USA)

Separator A

Preparation of Polymeric Chelator of Multivalent Cations Such as $Me^{2+}$:

2,6 dimethylpolyphenylene oxide (PPO) was purchased from Sigma-Aldrich (St. Louis, Mo., USA). On the original polymer (PPO) or the high molecular weight fraction of the PPO, bromomethylation of 2,6 dimethyl polyphenylene oxide (after purification) was carried out according to the procedure described in U.S. Pat. No. 4,468,501. For example, to form a Br capacity (determined by NMR) of 2.98 meq/gr, 12.5 gr of PPO (0.104 moles) and 4 ml (0.075 mole) of bromine were used. The PPO was dissolved in 160 ml of chlorobenzene (pure, Carlo Erba Reagents, Italy) and then refluxed. Under reflux the bromine was slowly added over a 2 hr period. After all bromine was added, reflux was continued for another 30 minutes. To make a Br capacity (determined by NMR) of 3.7 meq/gr PPO, 25 g (0.208 mole), 8 g (0.15 mole) bromine and 320 ml of chlorobenzene were used. Bromination could also have been carried out using the procedure described in U.S. Pat. No. 5,028,337 with carbon tetrachloride instead of chlorobenzene. By adjusting the conditions such as the Br concentration and time of reaction, a range of different bromomethylated concentrations could be achieved from less than 1 to more than 4 meq/gr.

To form the chelator, the bromomethylated PPO with 2.5 meq/gram Br described above was reacted with iminodiacteic acid purchased from Sigma-Aldrich (St. Louis, Mo., USA). The reaction took place in THF/Ethanol/Water solution adjusted to a pH of ~10 with a two-fold excess of the iminiodiacetic acid as compared to the bromomethylated PPO at 60° C. for 6 hours. The Br groups on the polymer were replaced with the iminodiacetic acid groups to form a PPO polymer derivative with iminodiacetic acid groups attached to the methyl groups of the polymer backbone.

The iminodiacetic acid PPO polymer derivative (40% by weight) was mixed with Hexafluoropropylene (HFP) copolymer of PVDF (Sigma-Aldrich catalog No 42,716-0, 60% by weight) purchased from Sigma-Aldrich (St. Louis, Mo., USA)) in THF. A wet film of the solution was cast on a glass plate and then immersed in water to form a 20 micrometer thick porous sheet as a separator A according to the teachings herein.

The thus-prepared separator A was used in preparing an electrochemical cell including a LNMS positive electrode and graphite negative electrode.

The cycle-life of the electrochemical cell with separator A was tested as described above and shown to be 75% longer at room temperature and 120% longer at 45° C. compared to a reference electrochemical cell.

Separator B

The procedure of preparing separator A described above was repeated using aminoethylphosphonic acid instead of iminodiacetic acid.

The thus-prepared separator B according to the teachings herein was used in preparing an electrochemical cell including a LNMS positive electrode and graphite negative electrode. The cycle-life of the electrochemical cell with separator B was tested as described above and shown to be 55% longer at room temperature and 100% longer at 45° C. compared to a reference electrochemical cell.

Separator C

The procedure of preparing separator A described above is repeated, but a wet film of the solution is cast on a glass plate and then immersed in water to form a 10 micrometer thick porous sheet. The thus-prepared porous sheet is sandwiched between two sheets of microporous PVDF (60% porosity, 15 micrometer thick from Porous Power Technologies LLC, Colorado, USA) to constitute a laminated separator C according to the teachings herein. The laminated separator is used in preparing an electrochemical cell including a LNMS positive electrode and graphite negative electrode. The cycle-life of the electrochemical cell with the laminated separator is tested as described above and shown to be substantially longer at room temperature and at 45° C. compared to a reference electrochemical cell.

Separator D

The preparation of iminodiacetic acid PPO polymer as described above with reference to separator A described above was repeated.

Preparation of Sulfonated Polysulfone (SPSu):

Polysulfone (Sigma-Aldrich catalogue Nr. 42, 831-0) was sulfonated by drying a given amount overnight at 100° C., cooling and dissolving in chloroform. The solution was cooled to −10° C., chlorosulfonic acid was added and the solution was stirred under $N_2$ at between 0° to 4° C. for 60 minutes. The polymer in the resulting solution was then precipitated by adding to an ethanol/water solution, washed with deionized water and an equivalent amount of 1N lithium hydroxide was added to obtain the Lithium salt of the sulfonated polysulfone. The lithium salt of the sulfonated polysulfone was isolated by filtration and dried in a vacuum-oven overnight.

The iminodiacetic acid PPO polymer (30% by weight) was mixed with Hexafluoropropylene (HFP) copolymer of PVDF (Sigma-Aldrich catalog No 42,716-0, 50% by weight) and lithium salt of sulfonated polysulfone (IEC 1.4 meq/gr, 20% by weight) both purchased from Sigma-Aldrich (St. Louis, Mo., USA)) in THF. A 20 micrometer thick porous sheet was formed from the solution by casting wet film of the solution on a glass plate and then immersing the wet film in water to form a porous membrane sheet as a separator D according to the teachings herein.

The thus-prepared separator A was used in preparing an electrochemical cell including a LNMS positive electrode and graphite negative electrode.

The cycle-life of the electrochemical cell with separator D was tested as described above and shown to be 75% longer at room temperature and 120% longer at 45° C. compared to a reference electrochemical cell, that is to say, substantially the same as separator A. However, the charging time of the electrochemical cell with separator D was seen to be 30% shorter.

Separator E

A 20 micrometer thick separator A was coated on both side with a 2 to 5 micrometer thick layer of sulfonated fluorinated polysulfone of 1.3 IEC. Coating was carried out with an ethanol/water solution of the sulfonated fluorinated polysulfone described with reference to Separator D. With complete drying, a 30 micrometer thick separator E was formed.

The thus-prepared separator E was used in preparing an electrochemical cell including a LNMS positive electrode and graphite negative electrode.

The cycle-life of the electrochemical cell with separator E was tested as described above and shown to be 180% longer at room temperature and 170% longer at 45° C. compared to a reference electrochemical cell.

Separator F

Bromomethylation of 2,6 dimethyl polyphenylene oxide was carried out according to the procedure described in U.S. Pat. No. 4,468,501. To form a 2,6 di-(trimethylammonium)-methyl-polyphenylene oxide the bromomethylated polymer was dissolved in THF (tetrahydrofuran) to form a 10% solution and to this an excess of trimethylamine was added stirred for 24 hours to form the quaternized polymer which was isolated by precipitation in water, dried and then used.

A 20 micrometer thick separator A was coated on both sides with a 2 to 5 micrometer thick layer of the anion exchange polymer 2,6 di(trimethylammonium)-methyl-polyphenylene oxide of 1.3 meq/gr IEC With evaporation of water, a 35 micrometer thick laminated separator F was formed.

The thus-prepared separator F was used in preparing an electrochemical cell including a LNMS positive electrode and graphite negative electrode.

The cycle-life of the electrochemical cell with separator F was tested as described above and shown to be 130% longer at room temperature and 115% longer at 45° C. compared to a reference electrochemical cell.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Citation or identification of any balancing in this application shall not be construed as an admission that such balancing is available as prior art to the invention.

Section headings are used herein to ease understanding of the specification and should not be construed as necessarily limiting.

What is claimed is:

1. An electrochemical cell, comprising:
   a. an electrode assembly including:
      i. at least one positive electrode having a height, a breadth and a thickness bearing a positive active material on at least one face thereof;
      ii. at least one negative electrode having a height, a breadth and a thickness bearing a negative active material on at least one face thereof, facing said positive electrode; and
      iii. a separator disposed between said positive electrode and said negative electrode and electrically insulating said positive electrode from said negative electrode; and
   b. an electrolyte contacting said positive electrode, said negative electrode and said separator;
   said separator a membrane permeable to lithium ions and including:
      a support sheet; and on said support sheet, binding functions configured to bind multivalent cations preferentially to lithium ions
      wherein said support sheet comprises a sheet of polymer to which at least one type of said binding function is grafted, and
      wherein said support sheet comprises an aminoethylphosphonic acid PPO polymer derivative, including aminoethylphosphonic acid residues as a said binding function.

2. The electrochemical cell of claim 1, being a lithium-ion secondary electrochemical cell, wherein:
   said positive-active material is a lithium-ion containing positive active material;
   said negative-active material is a lithium-ion intercalating negative active material; and
   wherein said electrolyte includes lithium ions.

3. The electrochemical cell of claim 1, further comprising on said support sheet, lithium-permeation functions configured to enhance the permeability of the membrane to lithium ions.

4. The electrochemical cell of claim 3, wherein said support sheet comprises a sulfonated polysulfone polymer derivative and an iminodiacetic acid PPO polymer, includes sulfonic groups as said lithium-permeation function and iminodiacetic groups as said binding function.

5. The electrochemical cell of claim 3, wherein said support sheet comprises a fluorinated sulfonated polysulfone polymer derivative and an iminodiacetic acid PPO polymer, includes sulfonic groups as said lithium-permeation function and iminodiacetic groups as said binding function.

6. The electrochemical cell claim 1, wherein said support sheet comprises a sheet of polymer to which at least one type of said binding function is grafted, and
wherein said support sheet comprises an iminodiacetic acid PPO polymer derivative, including iminodiacetic acid residues as a said binding function.

7. The electrochemical cell of claim 1, said support sheet further comprising a HFP copolymer of PVDF.

8. The electrochemical cell of claim 1,
wherein said support sheet comprises a sheet of polymer to which a layer of adhering substrate adheres,
wherein at least one type of said binding function is borne by particles, said particles adhered to said support sheet with said adhering substrate,
wherein said particles are selected from the group consisting of organic particles, inorganic particles, hybrid particles and mixtures thereof,
wherein said inorganic particles are selected from the group consisting of bentonite and zeolite.

9. The electrochemical cell of claim 1,
wherein said support sheet comprises a sheet of polymer to which a layer of adhering substrate adheres,
wherein at least one type of said binding function is borne by particles, said particles adhered to said support sheet with said adhering substrate,
wherein said particles are selected from the group consisting of organic particles, inorganic particles, hybrid particles and mixtures thereof,
wherein said organic particles are selected from the group consisting of ion-exchange resins.

10. The electrochemical cell of claim 9, wherein:
said support sheet includes a sheet of microporous PVDF;
said adhering substrate includes Hexafluoropropylene (HFP) copolymer of PVDF; and
said binding function includes particulate ion-exchange resin.

11. An electrochemical cell, comprising:
a. an electrode assembly including:
i. at least one positive electrode having a height, a breadth and a thickness bearing a positive active material on at least one face thereof;
ii. at least one negative electrode having a height, a breadth and a thickness bearing a negative active material on at least one face thereof, facing said positive electrode; and
iii. a separator disposed between said positive electrode and said negative electrode and electrically insulating said positive electrode from said negative electrode; and
b. an electrolyte contacting said positive electrode, said negative electrode and said separator;
said separator a membrane permeable to lithium ions and including:
a support sheet; and on said support sheet, binding functions configured to bind multivalent cations preferentially to lithium ions
further comprising on said support sheet, lithium-permeation functions configured to enhance the permeability of the membrane to lithium ions,
wherein said support sheet comprises a fluorinated sulfonated polysulfone polymer derivative and an iminodiacetic acid PPO polymer, includes sulfonic groups as said lithium-permeation function and iminodiacetic groups as said binding function.

12. The electrochemical cell of claim 11, being a lithium-ion secondary electrochemical cell, wherein:
said positive-active material is a lithium-ion containing positive active material;
said negative-active material is a lithium-ion intercalating negative active material; and
wherein said electrolyte includes lithium ions.

13. The electrochemical cell claim 11, wherein said support sheet comprises a sheet of polymer to which at least one type of said binding function is grafted, and
wherein said support sheet comprises an iminodiacetic acid PPO polymer derivative, including iminodiacetic acid residues as a said binding function.

14. The electrochemical cell of claim 11,
wherein said support sheet comprises a sheet of polymer to which at least one type of said binding function is grafted, and
wherein said support sheet comprises an aminoethylphosphonic acid PPO polymer derivative, including aminoethylphosphonic acid residues as a said binding function.

15. The electrochemical cell of claim 11, said support sheet further comprising a HFP copolymer of PVDF.

16. The electrochemical cell of claim 11,
wherein said support sheet comprises a sheet of polymer to which a layer of adhering substrate adheres,
wherein at least one type of said binding function is borne by particles, said particles adhered to said support sheet with said adhering substrate,
wherein said particles are selected from the group consisting of organic particles, inorganic particles, hybrid particles and mixtures thereof,
wherein said inorganic particles are selected from the group consisting of bentonite and zeolite.

17. The electrochemical cell of claim 11,
wherein said support sheet comprises a sheet of polymer to which a layer of adhering substrate adheres,
wherein at least one type of said binding function is borne by particles, said particles adhered to said support sheet with said adhering substrate,
wherein said particles are selected from the group consisting of organic particles, inorganic particles, hybrid particles and mixtures thereof,
wherein said organic particles are selected from the group consisting of ion-exchange resins.

18. The electrochemical cell of claim 17, wherein:
said support sheet includes a sheet of microporous PVDF;
said adhering substrate includes Hexafluoropropylene (HFP) copolymer of PVDF; and
said binding function includes particulate ion-exchange resin.

* * * * *